United States Patent
Amano

(10) Patent No.: US 8,214,611 B2
(45) Date of Patent: Jul. 3, 2012

(54) STORAGE SUBSYSTEM AND ITS DATA PROCESSING METHOD, AND COMPUTER SYSTEM

(75) Inventor: Takashi Amano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 12/527,412

(22) PCT Filed: Jun. 4, 2009

(86) PCT No.: PCT/JP2009/060652
§ 371 (c)(1),
(2), (4) Date: Aug. 14, 2009

(87) PCT Pub. No.: WO2010/140264
PCT Pub. Date: Dec. 9, 2010

(65) Prior Publication Data
US 2011/0264877 A1    Oct. 27, 2011

(51) Int. Cl.
*G06F 12/16* (2006.01)
(52) U.S. Cl. .. 711/162; 707/654; 709/226; 711/E12.103
(58) Field of Classification Search .......... None
See application file for complete search history.

(56) References Cited

U.S. PATENT DOCUMENTS

| | | | |
|---|---|---|---|
| 6,715,048 B1* | 3/2004 | Kamvysselis | 711/162 |
| 7,461,201 B2 | 12/2008 | Amano et al. | |
| 7,529,834 B1* | 5/2009 | Birrell et al. | 709/226 |
| 2002/0166026 A1* | 11/2002 | Ulrich et al. | 711/114 |
| 2004/0034672 A1* | 2/2004 | Inagaki | 707/204 |
| 2004/0153614 A1* | 8/2004 | Bitner et al. | 711/162 |
| 2006/0020691 A1* | 1/2006 | Patterson et al. | 709/223 |
| 2008/0263551 A1* | 10/2008 | Ali et al. | 718/102 |
| 2008/0294857 A1* | 11/2008 | Grimes et al. | 711/161 |

* cited by examiner

*Primary Examiner* — Kevin Ellis
*Assistant Examiner* — Nathan N Sadler
(74) *Attorney, Agent, or Firm* — Foley & Lardner LLP

(57) ABSTRACT

Efficiently utilizing the bandwidth of the host interface unit even after restoration. A controller manages a storage area of a disk as multiple logical units (LUs), as well as measures the bandwidth used by each host interface unit as load information, stores the load information at the time of the backup, and at the time of the restoration, restores the backup data in logical units in the restoration destination and, with reference to the load information, distributes the paths connecting the logical units in the access source and the logical units in the restoration destination to the host interface units.

12 Claims, 41 Drawing Sheets

| STORAGE SUBSYSTEM ID | UNUSED CAPACITY | | MANAGEMENT I/F | CPU USAGE RATE | IP ADDRESS | UPPER LIMIT OF BANDWIDTH [Mbps] | USED BANDWIDTH [Mbps] |
|---|---|---|---|---|---|---|---|
| | FC CAPACITY | SATA CAPACITY | | | | | |
| storage0 | 5000GB | 5000GB | 192.168.1.1 | 70 | 192.168.0.1 | 100 | 65 |
| | | | | | 192.168.0.2 | 100 | 30 |

200 / 203 / 201 / 204 / 202 / 205 / 206 / 207 / 208 → 120

| RAID GROUP ID | INTERNAL LUN | TARGET NAME | IP ADDRESS | PORT NUMBER | EXTERNAL LUN | LUID | DISK TYPE | LU STATUS |
|---|---|---|---|---|---|---|---|---|
| 0 | 0 | LVM-0-000 | 192.168.0.1 | 50000 | 0 | LVM-0 | FC | NORMAL |
| 0 | 1 | LVM-0-001 | 192.168.0.2 | 50001 | 0 | LVM-0 | FC | NORMAL |
| 0 | 2 | LVM-0-002 | 192.168.0.2 | 50002 | 0 | LVM-0 | FC | NORMAL |
| 0 | 3 | LVM-0-003 | 192.168.0.1 | 50003 | 0 | LVM-0 | FC | NORMAL |
| 1 | 60 | LVM-1-000 | 192.168.0.1 | 60000 | 0 | LVM-1 | SATA | NORMAL |
| 1 | 61 | LVM-1-001 | 192.168.0.1 | 60001 | 0 | LVM-1 | SATA | NORMAL |
| 1 | 62 | LVM-1-002 | 192.168.0.2 | 60002 | 0 | LVM-1 | SATA | NORMAL |
| 2 | 63 | LUN-7-0 | 192.168.0.1 | 55000 | 0 | LU-0 | SATA | ABNORMAL |

FIG.4

| RAID GROUP ID | INTERNAL LUN | IP ADDRESS | HOST I/F BANDWIDTH |
|---|---|---|---|
| 0 | 0 | 192.168.0.1 | 19Mbps |
| 0 | 1 | 192.168.0.1 | 4Mbps |
| 0 | 2 | 192.168.0.1 | 11Mbps |
| 0 | 3 | 192.168.0.1 | 16Mbps |
| 1 | 4 | 192.168.0.2 | 0Mbps |
| 1 | 5 | 192.168.0.2 | 0Mbps |
| 1 | 6 | 192.168.0.2 | 0Mbps |
| 1 | 7 | 192.168.0.2 | 0Mbps |
| ⋮ | ⋮ | ⋮ | ⋮ |

FIG.5

| IP ADDRESS | iSCSI TARGET NAME | iSCSI INITIATOR NAME |
|---|---|---|
| 192.168,0.1 | LVM-0-000 | host01 |
|  | LVM-0-001 | host02 |
|  | LVM-0-002 | host03 |
| 192.168,0.2 | LVM-1-001 | host04 |
|  | LVM-1-002 | host05 |

FIG.6

| PVOL | | SVOL | | DATE AND TIME | BACKUP TYPE | HOST I/F BANDWIDTH [Mbps] | DISK TYPE |
|---|---|---|---|---|---|---|---|
| STORAGE SUBSYSTEM ID | LUN | STORAGE SUBSYSTEM ID | INTERNAL LUN | | | | |
| storage0 | 0 | storage0 | 4 | 2009/01/01 | FULL | 19 | FC |
| storage0 | 1 | storage0 | 5 | 2009/01/01 | FULL | 4 | FC |
| storage0 | 2 | storage0 | 6 | 2009/01/01 | FULL | 11 | FC |
| storage0 | 3 | storage0 | 7 | 2009/01/01 | FULL | 16 | FC |
| storage0 | 60 | storage0 | 70 | 2009/01/02 | FULL | 2 | SATA |
| storage0 | 61 | storage0 | 71 | 2009/01/02 | FULL | 3 | SATA |
| storage0 | 62 | storage0 | 72 | 2009/01/02 | FULL | 8 | SATA |
| ... | ... | ... | ... | ... | ... | ... | ... |

FIG.8

| 600 | 302 | 303 | 304 | 305 |
|---|---|---|---|---|
| LVM-LUN | TARGET NAME | IP ADDRESS | PORT NUMBER | EXTERNAL LUN |
| 0 | LVM-0-000 | 192.168.0.1 | 50000 | 0 |
| 0 | LVM-0-001 | 192.168.0.1 | 50001 | 0 |
| 0 | LVM-0-002 | 192.168.0.1 | 50002 | 0 |
| 0 | LVM-0-003 | 192.168.0.1 | 50003 | 0 |

RESTORATION SETTING SCREEN — 3400

- PURPOSE: TEST — 3401
- EMERGENCY: LOW — 3402
- iSCSI INITIATOR NAME: host1 — 3403

| RESTORATION ID | TARGET | LUID | DATE AND TIME | BACKUP TYPE |
|---|---|---|---|---|
| 1 | ✓ | LVM-0 | 2009/01/01 | FULL |
| 2 |  | LVM-1 | 2009/01/01 | FULL |
| 3 |  | LU-0 | 2009/01/01 | FULL |
| 4 |  | LVM-2 | 2009/01/01 | FULL |

3404　3405　3406　3106　3107

OK — 3409　　Cancel — 3410

FIG.21

| RAID GROUP ID | INTERNAL LUN | TARGET NAME | IP ADDRESS | PORT NUMBER | EXTERNAL LUN | LUID | DISK TYPE | LU STATUS |
|---|---|---|---|---|---|---|---|---|
| 0 | 10 | LVM-0-000 | 192.168.0.2 | 50000 | 0 | LVM-0 | FC | NORMAL |
| 0 | 11 | LVM-0-001 | 192.168.0.1 | 50001 | 0 | LVM-0 | FC | NORMAL |
| 0 | 12 | LVM-0-002 | 192.168.0.2 | 50002 | 0 | LVM-0 | FC | NORMAL |
| 0 | 13 | LVM-0-003 | 192.168.0.1 | 50003 | 0 | LVM-0 | FC | NORMAL |
| 1 | 60 | LVM-1-000 | 192.168.0.1 | 60000 | 0 | LVM-1 | SATA | NORMAL |
| 1 | 61 | LVM-1-001 | 192.168.0.1 | 60001 | 0 | LVM-1 | SATA | NORMAL |
| 1 | 62 | LVM-1-002 | 192.168.0.2 | 60002 | 0 | LVM-1 | SATA | NORMAL |
| 2 | 63 | LUN-7-0 | 192.168.0.1 | 55000 | 0 | LVM-0 | SATA | ABNORMAL |
| ... | ... | ... | ... | ... | ... | ... | ... | ... |

FIG.22

| PVOL | | SVOL | | DATE AND TIME | BACKUP TYPE | HOST I/F BANDWIDTH | DISK TYPE |
|---|---|---|---|---|---|---|---|
| STORAGE SUBSYSTEM ID | INTERNAL LUN | STORAGE SUBSYSTEM ID | INTERNAL LUN | | | | |
| storage0 | 10 | storage0 | 4 | 2009/01/01 | FULL | 19 | FC |
| storage0 | 11 | storage0 | 7 | 2009/01/01 | FULL | 16 | FC |
| storage0 | 12 | storage0 | 6 | 2009/01/01 | FULL | 11 | FC |
| storage0 | 13 | storage0 | 5 | 2009/01/01 | FULL | 4 | FC |
| storage0 | 60 | storage0 | 70 | 2009/01/02 | FULL | 2 | SATA |
| storage0 | 61 | storage0 | 71 | 2009/01/02 | FULL | 3 | SATA |
| storage0 | 62 | storage0 | 72 | 2009/01/02 | FULL | 8 | SATA |
| ... | ... | ... | ... | ... | ... | ... | ... |

FIG.23

| STORAGE SUBSYSTEM ID | UNUSED CAPACITY | | MANAGEMENT I/F | CPU USAGE RATE | IP ADDRESS | UPPER LIMIT OF BANDWIDTH [Mbps] | USED BANDWIDTH [Mbps] |
|---|---|---|---|---|---|---|---|
| | FC CAPACITY | SATA CAPACITY | | | | | |
| storage0 | 5000GB | 5000GB | 192.168.1.1 | 70 | 192.168.0.1 | 100 | 50 |
| | | | | | 192.168.0.2 | 100 | 45 |

| PVOL | | SVOL | | DATE AND TIME | BACKUP TYPE | HOST I/F BANDWIDTH [Mbps] | DISK TYPE |
|---|---|---|---|---|---|---|---|
| STORAGE SUBSYSTEM ID | INTERNAL LUN | STORAGE SUBSYSTEM ID | INTERNAL LUN | | | | |
| storage0 | 0 | storage0 | 4 | 2009/01/01 | FULL | 19 | FC |
| storage0 | 1 | storage0 | 5 | 2009/01/01 | FULL | 16 | FC |
| storage0 | 60 | storage0 | 70 | 2009/01/02 | FULL | 2 | SATA |
| storage0 | 61 | storage0 | 71 | 2009/01/02 | FULL | 3 | SATA |
| storage0 | 62 | storage1 | 72 | 2009/01/02 | FULL | 8 | SATA |
| ... | ... | ... | ... | ... | ... | ... | ... |

FIG.27

| 3100 | 3101 3102 | 3103 3104 3105 | 3106 | 3107 | 3108 | 3109 |
|---|---|---|---|---|---|---|
| PVOL | | SVOL | | | | |
| STORAGE SUBSYSTEM ID | INTERNAL LUN | STORAGE SUBSYSTEM ID | INTERNAL LUN | DATE AND TIME | BACKUP TYPE | HOST I/F BANDWIDTH [Mbps] | DISK TYPE |
| storage1 | 0 | storage1 | 2 | 2009/01/01 | FULL | 4 | FC |
| storage1 | 1 | storage1 | 3 | 2009/01/01 | FULL | 11 | FC |
| storage1 | 9 | storage1 | 6 | 2009/01/01 | FULL | 13 | FC |
| storage1 | 60 | storage1 | 70 | 2009/01/02 | FULL | 2 | SATA |
| storage1 | 61 | storage1 | 71 | 2009/01/02 | FULL | 3 | SATA |
| storage1 | 62 | storage1 | 72 | 2009/01/02 | FULL | 8 | SATA |
| ... | ... | ... | ... | ... | ... | ... | ... |

↙ 125

| 200 | 203 201 | 204 | 202 | 205 | 206 | 207 | 208 |
| --- | --- | --- | --- | --- | --- | --- | --- |
| STORAGE SUBSYSTEM ID | UNUSED CAPACITY | | MANAGEMENT I/F | CPU USAGE RATE | IP ADDRESS | UPPER LIMIT OF BANDWIDTH [Mbps] | USED BANDWIDTH [Mbps] |
| | FC CAPACITY | SATA CAPACITY | | | | | |
| storage0 | 5000GB | 5000GB | 192.168.1.1 | 70 | 192.168.0.1 | 100 | 65 |
| | | | | | 192.168.0.2 | 100 | 100 |

| STORAGE SUBSYSTEM ID | UNUSED CAPACITY | | MANAGEMENT I/F | CPU USAGE RATE | IP ADDRESS | UPPER LIMIT OF BANDWIDTH [Mbps] | USED BANDWIDTH [Mbps] |
| --- | --- | --- | --- | --- | --- | --- | --- |
| | FC CAPACITY | SATA CAPACITY | | | | | |
| storage0 | 5000GB | 5000GB | 192.168.1.1 | 70 | 192.168.1.1 | 100 | 30 |
| | | | | | 192.168.1.2 | 100 | 100 |

| SYSTEM GROUP ID | STORAGE SUBSYSTEM ID | MANAGEMENT I/F |
|---|---|---|
| System0 | Storage0 | 192.168.1.1 |
| System0 | Storage1 | 192.168.1.2 |

FIG.32

| STORAGE POOL ID | STORAGE SUBSYSTEM ID | UNUSED CAPACITY |
|---|---|---|
| Storage-Pool0 | Storage0 | 150GB |
| Storage-Pool0 | Storage1 | 5000GB |

| STORAGE SUBSYSTEM ID | UNUSED CAPACITY | | MANAGEMENT I/F | CPU USAGE RATE | IP ADDRESS | UPPER LIMIT OF BANDWIDTH [Mbps] | USED BANDWIDTH [Mbps] |
|---|---|---|---|---|---|---|---|
| | FC CAPACITY | SATA CAPACITY | | | | | |
| storage0 | 5000GB | 5000GB | 192.168.1.1 | 70 | 192.168.0.1 | 100 | 50 |
| | | | | | 192.168.0.2 | 100 | 100 |

FIG.38

| PVOL | | SVOL | | DATE AND TIME | BACKUP TYPE | HOST I/F BANDWIDTH [Mbps] | DISK TYPE |
|---|---|---|---|---|---|---|---|
| STORAGE SUBSYSTEM ID | INTERNAL LUN | STORAGE SUBSYSTEM ID | INTERNAL LUN | | | | |
| storage0 | 20 | storage0 | 5 | 2009/01/01 | FULL | 16 | FC |
| storage0 | 21 | storage0 | 3 | 2009/01/01 | FULL | 11 | FC |
| storage0 | 60 | storage0 | 70 | 2009/01/02 | FULL | 2 | SATA |
| storage0 | 61 | storage0 | 71 | 2009/01/02 | FULL | 3 | SATA |
| storage0 | 62 | storage1 | 72 | ... | ... | 8 | SATA |
| ... | ... | ... | ... | ... | ... | ... | ... |

FIG.39

| PVOL | | SVOL | | DATE AND TIME | BACKUP TYPE | HOST I/F BANDWIDTH [Mbps] | DISK TYPE |
|---|---|---|---|---|---|---|---|
| STORAGE SUBSYSTEM ID | INTERNAL LUN | STORAGE SUBSYSTEM ID | INTERNAL LUN | | | | |
| storage1 | 30 | storage0 | 4 | 2009/01/01 | FULL | 19 | FC |
| storage1 | 31 | storage1 | 2 | 2009/01/01 | FULL | 4 | FC |
| storage1 | 9 | storage1 | 6 | 2009/01/01 | FULL | 13 | FC |
| storage1 | 60 | storage1 | 70 | 2009/01/02 | FULL | 2 | SATA |
| storage1 | 61 | storage1 | 71 | 2009/01/02 | FULL | 3 | SATA |
| storage1 | 62 | storage1 | 72 | 2009/01/02 | FULL | 8 | SATA |
| ... | ... | ... | ... | ... | ... | ... | ... |

STORAGE SUBSYSTEM AND ITS DATA PROCESSING METHOD, AND COMPUTER SYSTEM

TECHNICAL FIELD

This invention relates to a storage subsystem that provides a storage area of a storage device to a host, and specifically to the technologies of data backup and restoration in a storage subsystem and between multiple storage subsystems.

BACKGROUND ART

There are some cases in which multiple storage subsystems are connected for storing data in a large-scale computer system. In these cases, if the restoration destination of the backup data is a specific storage subsystem, the load is concentrated, and it was difficult to reach the limit performance of the computer system.

One of the technologies for improving the restoration of the backup data is the technology of reducing and accelerating the restoration time (refer to Patent Document 1).

More specifically, if the same backup data is stored both in the disk and on the tape, this technology performs the restoration using the data stored in the disk to which high-speed access is possible, and achieves high-speed restoration. By the above-mentioned technology, high-speed restoration can be achieved.

RELATED ART DOCUMENTS

[Patent Document 1] U.S. Pat. No. 7,461,201

DISCLOSURE OF THE INVENTION

The above-mentioned restoration technology does not consider the load of the storage subsystem on the host I/F and the CPU (Central Processing Unit) after the restoration in the computer system including multiple storage subsystems.

More specifically, in the above-mentioned technology, restoration is performed in the storage subsystem in which the data of the backup source is stored, and therefore, in the computer system including multiple storage subsystems, if the load is concentrated on the host I/F of the storage subsystem as the restoration destination, the bandwidth required of the host I/F may exceed the upper limit, which may cause delay in the access. In this case, if another host I/F has an unused bandwidth, it becomes impossible to use the bandwidth of the host I/F of the overall multiple storage systems to the upper limit, and it becomes difficult to use the bandwidth of the host I/F efficiently.

This invention was devised in view of the above-mentioned problems. Thus, and object of this invention is to provide a storage subsystem and its data processing method and a computer system which can use the bandwidth of the host interface unit efficiently even after the restoration and approach the limit performance of the system.

In order to achieve the foregoing object, this invention is characterized by measuring load information of multiple host interface units that send and receive information to and from the host, storing load information measured at the time of the backup when creating data backup, and distributing the load of all host interface units with reference to the load information stored at the time of the backup when restoring the data.

This invention enables the efficient use of the bandwidth of the host interface unit after restoration and the provision of a highly scalable system which can easily approach the limit communication performance of the system.

BRIEF DESCRIPTION OF THE DRAWINGS

FIG. 4 is a diagram showing an example of the load management table in the first embodiment of this invention;

FIG. 5 is a diagram showing an example of the security management table in the first embodiment of this invention;

FIG. 6 is a diagram showing an example of the copy pair management table in the first embodiment of this invention;

FIG. 8 is a block diagram of an example of the LVM-LU management table in the first embodiment of this invention;

FIG. 18 is a diagram showing an example of the restoration setting screen in the first embodiment of this invention;

FIG. 21 is a diagram showing an example of the LU management table after restoration in the first embodiment of this invention;

FIG. 22 is a diagram showing an example of the copy pair management table after restoration in the first embodiment of this invention;

FIG. 23 is a diagram showing an example of the storage subsystem management table after restoration in the first embodiment of this invention;

FIG. 26 is a diagram showing an example of the copy pair management table in the second embodiment of this invention;

FIG. 27 is a diagram showing an example of the copy pair management table in the second embodiment of this invention;

FIG. 31 is a diagram showing an example of the system group management table in the second embodiment of this invention;

FIG. 32 is a diagram showing an example of the storage pool management table in the second embodiment of this invention;

FIG. 38 is a diagram showing an example of the copy pair management table after restoration in the second embodiment of this invention; and FIG. 39 is a diagram showing an example of the copy pair management table after restoration in the second embodiment of this invention.

BEST EMBODIMENT FOR CARRYING OUT THE INVENTION

Certain embodiments of this invention are described below with reference to the attached drawings.

Embodiment 1

The first embodiment measures the used bandwidth of multiple host interface units that exchange information with the host as load information, stores the load information measured when creating the data backup, and distributes the load of all host interface units with reference to the load information stored at the time of the data restoration.

Figure 1:
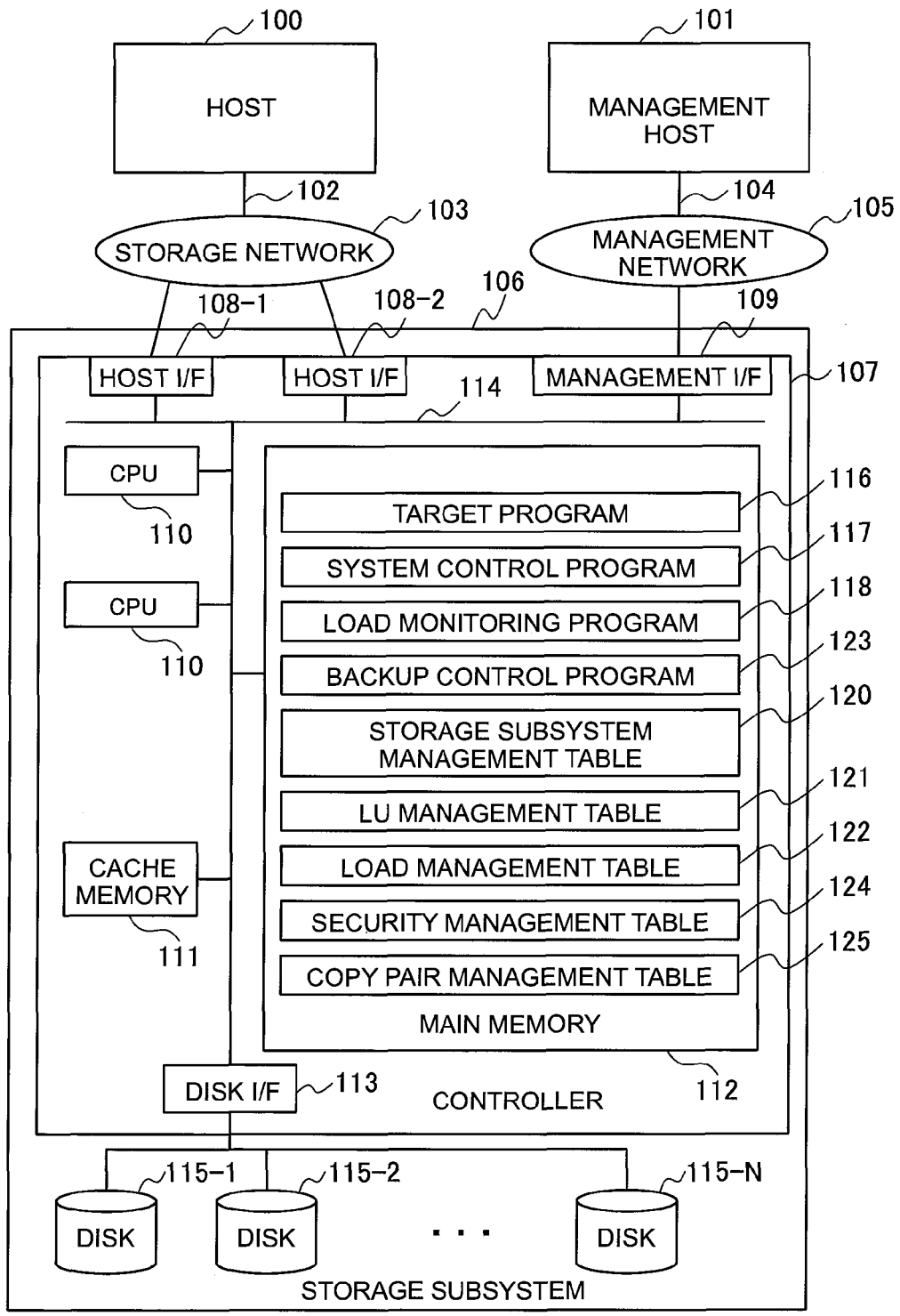
FIG. 1 is a block diagram showing a configuration example of the computer system in the first embodiment of this invention.

More specifically, the first embodiment distributes the host I/F bandwidth 400 (refer to FIG. 4) efficiently between the host I/Fs 108-1 and 108-2 when the application program 507 (refer to FIG. 7) accesses sequential storage areas as the access target (refer to FIG. 1). Hereinafter, unless otherwise specified, the processing of both read and write is referred to as access.

FIG. 1 is a block diagram of the computer system showing the first embodiment of this invention.

The computer system comprises a host 100, a management host 101, a storage subsystem 106, a storage network 103 for communication between the host 100 and the storage subsystem 106, and a management network 105 for communication between the management host 101 and the storage subsystem 106.

The host 100 is a host computer which issues a command for data input/output to the storage subsystem 106, writes data to the storage subsystem 106 and reads data from the storage subsystem 106.

The management host 101 is a host computer for managing the storage subsystem 106.

The storage subsystem 106 provides LUs (Logical Units) or logical volumes which are the storage areas for writing data into the host 100. That is, the storage subsystem 106 is connected with multiple disks 115-1 to 115-N as multiple storage devices, and the storage subsystem 106 manages the storage area of each disk 115 as multiple LUs or multiple logical volumes, and provides the LUs or the logical volumes as the storage areas for writing data to the host 100.

Furthermore, the storage subsystem 106 manages each disk 115 by dividing it into multiple RAID (Redundant Array of Inexpensive Disks) groups.

The host 100 and the storage subsystem 106 are, for example, connected with an Ethernet cable 102, and the Ethernet cable 102 is configured as a component of the storage network 103 only communicating between the host 100 and the storage subsystem 106.

The management host 101 and the storage subsystem 106 are, for example, connected with an Ethernet cable 104, and the Ethernet cable 104 is configured as a component of the management network 105 used for managing the management network 105.

The storage subsystem 106 comprises a controller 107 and multiple disks 115.

The controller 107 comprises multiple host I/Fs 108 (108-1 and 108-2), a management I/F 109, multiple CPUs 110, a cache memory 111, a main memory 112, and a disk I/F 113.

The host I/Fs 108 are the devices configured as the host interface units, and they are the network devices for communicating with the host 100. The storage subsystem 106 communicates with the host 100 via the host I/Fs 108 using the iSCSI protocol. In this case, for example, the IP (Internet Protocol) address 192.168.0.1 is allocated to the host I/F 108-1, and the IP (Internet Protocol) address 192.168.0.2 is allocated to the host I/F 108-2.

Note that, though the storage subsystem 106 shown in FIG. 1 includes only two host I/Fs 108, two or more may also be provided.

The management I/F 109 is the network device for communicating with the management host 101, and the storage subsystem 106, for example, communicates with the management host 101 using the TCP (Transmission Control Protocol)/IP protocol.

Each of the CPUs 110 executes programs stored in the main memory 112 as a processor.

The cache memory 111 is a storage device for temporarily storing the read data and write data requested by the host 100 and accelerating the data read and write.

The main memory 112 is a storage device for storing programs and management tables.

The disk I/F 113 is a device for the CPUs 110 to access the disks 115.

The host I/Fs 108, the management I/F 109, the CPUs 110, the cache memory 111, the main memory 112, and the disk I/F 113 are, for example, connected with each other by a bus 114. Similarly, the disk I/F 113 and the disks 115 are connected by the bus 114.

The main memory 112 stores a target program 116, a system control program 117, a load monitoring program 118, a backup control program 123, a storage subsystem management table 120 (refer to FIG. 2), an LU management table 121 (refer to FIG. 3), a load management table 122 (refer to FIG. 4), a security management table 124 (refer to FIG. 5), and a copy pair management table 125 (refer to FIG. 6).

Figure 7:
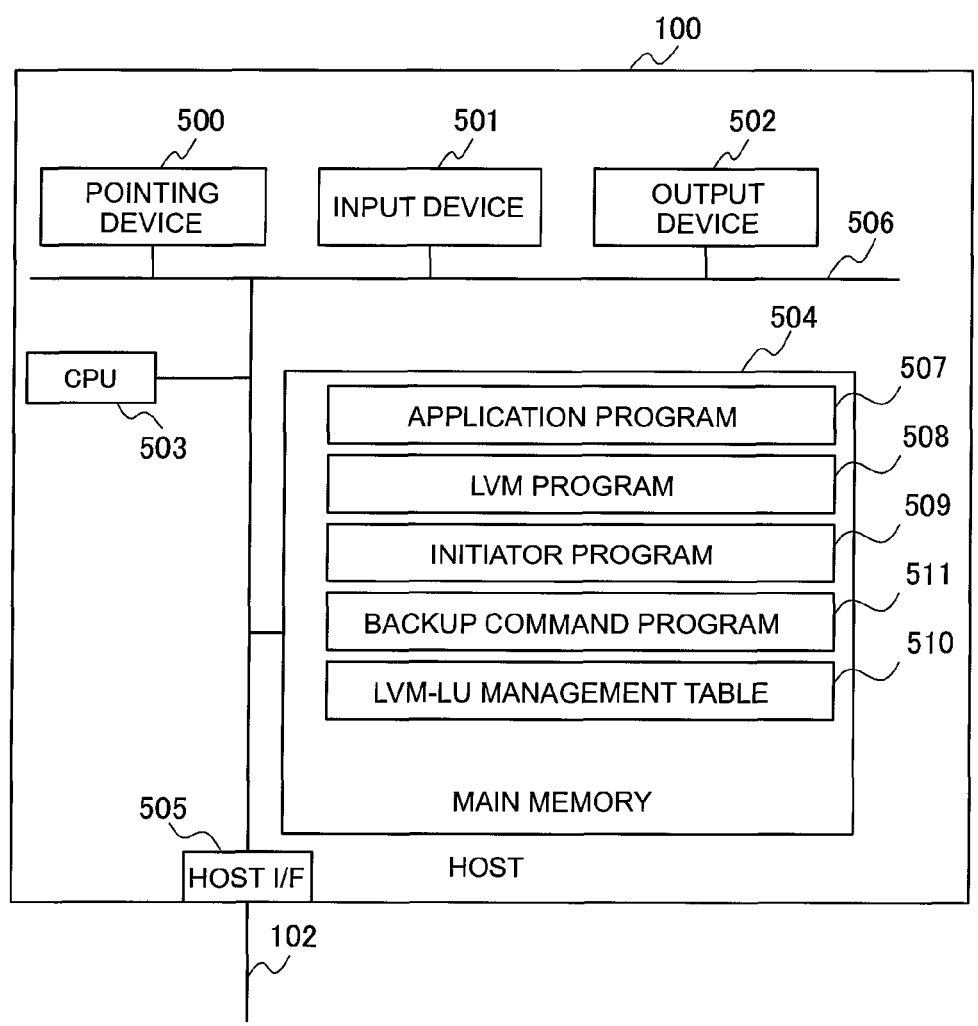
FIG. 7 is a block diagram showing a configuration example of the host in the first embodiment of this invention.

The target program 116 is a program which provides the iSCSI target function, and is used for communicating with the initiator program 509 of the host 100 (refer to FIG. 7).

The system control program 117 is a program for creating or deleting LUs.

The load monitoring program 118 is a program for measuring the bandwidth used by each of the host I/Fs 108 (108-1 and 108-2) per LU as load information.

The backup control program 123 is a program for creating backup data and restoring the data.

The details of the processing performed by each of the programs are described below, with reference to the flowchart of each processing described later.

The storage subsystem management table 120 is a table for managing information related to the storage subsystem 106. The LU management table 121 is a table for managing information related to the LUs. The load management table 122 is a table for managing the bandwidth used by each LU.

The security management table 124 is a table for managing the host I/Fs 108 and the LUs which are accessible by the host 100.

The copy pair management table 125 is a table for managing the pairs of backup source LUs and backup destination LUs.

Note that the details of the tables are described referring to FIGS. 2, 3, 4, 5, and 6.

Figure 2:
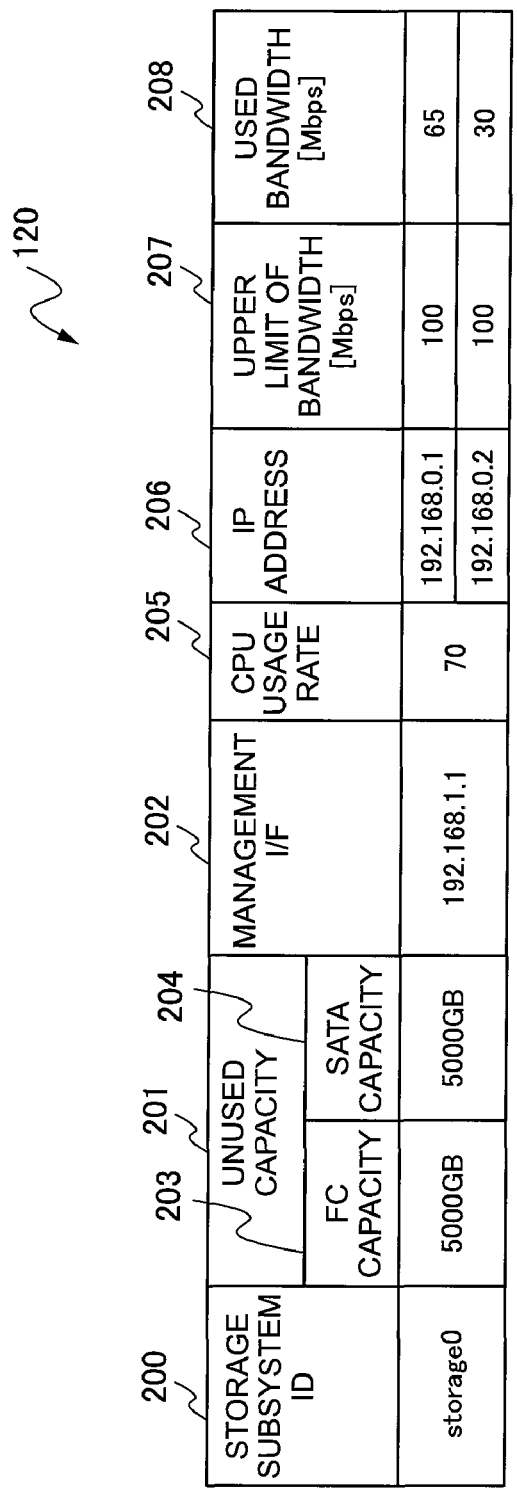
FIG. 2 is a diagram showing an example of the storage subsystem management table in the first embodiment of this invention.

FIG. 2 is a diagram showing an example of the storage subsystem management table 120 in the first embodiment of this invention.

The storage subsystem management table 120 includes a storage subsystem ID 200, an FC (Fibre Channel) capacity 203, a SATA (Serial AT Attachment) capacity 204, a management I/F 202, a CPU usage rate 205, an IP address 206, an upper limit of the bandwidth 207, and a used bandwidth 208.

The storage subsystem ID 200 stores an identifier for uniquely identifying the storage subsystem 106.

The unused capacity 201 stores the capacity which is not used as LUs of the storage area included in the storage subsystem 106, classified by disk types. That is, the unused capacity 201 stores the capacity of the storage area which can be allocated to LUs to be newly created. The FC capacity 203 stores the unused capacity of the FC disks. The SATA capacity 204 stores the unused capacity of the SATA disks.

The management I/F 202 stores the IP address allocated to the management I/F 109.

The CPU usage rate 205 stores the usage rate of each CPU 110. The upper limit of the bandwidth 207 stores the upper limit of the bandwidth of each host I/F 108. The used bandwidth 208 stores the bandwidth used by each host I/F 108.

Figure 3:
FIG. 3 is a diagram showing an example of the LU management table in the first embodiment of this invention.

FIG. 3 is a diagram showing an example of the LU management table 121 in the first embodiment of this invention.

The LU management table 121 includes a RAID group ID 300, an internal LUN (Logical Unit Number) 301, a target name 302, an IP address 303, a port number 304, an external LUN 305, an LU ID 306, a disk type 307, and an LU status 308.

The RAID group ID 300 stores the identifiers for uniquely identifying the RAID groups in the storage subsystem 106.

The internal LUN 301 stores the identifiers for uniquely identifying the LUs in the storage subsystem 106.

The target name 302 stores the names of the iSCSI targets allocated to the LUs.

The IP address 303 stores the IP addresses of the host I/Fs 108 allocated to the iSCSI targets.

The port number 304 stores the TCP port numbers of the IP addresses used when the target program 116 communicates with the initiator program 509.

The external LUN 305 stores the identifiers for the host 100 to uniquely identify the LUs allocated to the iSCSI targets.

The LU ID 306 stores the identifiers for uniquely identifying the virtual LUs created by the LVM (Logical Volume Management) program 508 (refer to FIG. 7) (hereinafter referred to as LVM-LUs) in the storage subsystem 106. By managing the LU IDs corresponding with the internal LUs, it can be ascertained which LVM-LU corresponds with which internal LU.

Furthermore, as the storage subsystem 106 maintains the information related to the LU ID 306, the correspondence information of LVM-LUs and LUs can be provided to management hosts other than the management host 101 in which the LUs for the LVM-LUs are set (omitted from the figure). The management hosts other than the management host 101 in which the LUs for the LVM-LUs, with reference to the correspondence information, can perform the processing of creating replications per LVM-LU and the like.

The disk type 307 stores the type of disks configuring the LUs.

The LU status 308 stores the LU status. "Abnormal" is stored if a failure occurs to the disk configuring the LU and the disk is inaccessible, and "normal" is stored if it is normally accessible.

FIG. 4 is a diagram showing an example of the load management table 122 in the first embodiment of this invention.

The load management table 122 includes a RAID group ID 300, an internal LUN 301, an IP address 303, and a host I/F bandwidth 400.

The host I/F bandwidth 400 stores the network bandwidth used by the target program 116 and the initiator program 509 (refer to FIG. 7) for communication. The load management table 122 manages the values measured per internal LU corresponding with the iSCSI target (the bandwidth used by each host I/F 108) as load information.

FIG. 5 is a diagram showing an example of the security management table 124 in the first embodiment of this invention.

The security management table 124 includes an IP address 303, an iSCSI target name 302, and an iSCSI initiator name 3000.

The security management table 124 can limit the internal LUs corresponding with the iSCSI target names accessible from the initiator program 509 (refer to FIG. 7) corresponding with the iSCSI initiator names. The table can further limit the host I/Fs 108 for the initiator program 509 to pass through when accessing the internal LUs. This processing can inhibit the access from the other initiator programs, which can prevent information leakage.

For example, the iSCSI initiator name host01 can access the internal LU whose iSCSI target name 302 is LVM-0-000 via the host I/F 108 whose IP address 303 is 192.168.0.1.

The iSCSI initiator name 3000 stores the identifier for uniquely identifying the initiator program 509 of the host 100.

The security management table 124 is registered by the administrator using the storage subsystem registration program 707 (refer to FIG. 8). In other cases, according to the command by the restoration command program 701, the system control program 117 registers the required information in the security management table 124.

FIG. 6 is a diagram showing an example of the copy pair management table 125 in the first embodiment of this invention.

The copy management table 125 is the table for managing backup data, and it registers the information at the time of backup performed by the backup control program 123.

The copy pair management table 125 includes a PVOL (Primary Volume) 3100, a storage subsystem ID 3101, an internal LUN 3102, an SVOL (Secondary Volume) 3103, a storage subsystem ID 3104, an internal LUN 3105, a date and time 3106, a backup type 3107, a host I/F bandwidth 3108, and a disk type 3109.

The PVOL 3100 stores the storage subsystem ID 3101 and the internal LUN 3102 as the information related to the LU storing the data which is the backup source. The SVOL 3103 stores the storage subsystem ID 3104 and the internal LUN 3105 as the information related to the LU storing the data which is the backup destination.

The storage subsystem ID 3101 stores the storage ID of the backup source. The internal LUN 3102 stores the LUN of the backup source. The storage subsystem ID 3104 stores the storage subsystem ID of the backup source. The internal LUN 3105 is the LUN of the backup target. The date and time 3106 stores the date and time of performing the backup. The backup type 3107 stores the performed backup type. "Full" is stored for the full backup, "differential" for the differential backup, and "incremental" for the incremental backup. The host I/F bandwidth 3108 stores the port bandwidth used by the access to the backup source LU at the time of the backup. The disk type 3109 stores the type of the disk configuring the backup source LU.

FIG. 7 is a block diagram showing a configuration example of the host 100 in the first embodiment of this invention.

The host 100 includes a pointing device 500, an input device 501, an output device 502, a CPU 503, a main memory 504, and a host I/F 505. The pointing device 500, the input device 501, the output device 502, the CPU 503, the main memory 504, and the host I/F 505 are connected with each other, for example, by a bus 506.

The pointing device 500 and the input device 501 send the information input by the administrator to the CPU 503. For example, the pointing device 500 is a mouse, and the input device 501 is a keyboard.

The output device 502 outputs the information specified by the CPU 503. For example, the output device 502 is a liquid crystal display.

The CPU 503 executes the programs stored in the main memory 504.

The main memory 504 includes an application program 507, an LVM program 508, an LVM-LU management table 510, and a backup command program 511.

The host I/F 505 is a network device for communicating with the storage subsystem 106; for example, the host 100 communicates with the storage subsystem 106 using the iSCSI protocol applied to the host I/F 505.

The application program 507 is a program for writing data into the storage subsystem 106 and reading data from the storage subsystem 106. For example, the application program is database software.

The backup command program 511 is a program for issuing backup commands to the backup control program 123 of the storage subsystem 106. The backup command program 511, in collaboration with the application program 507, makes the LU static. Furthermore, if the data to be written into the backup target LU is in the main memory 504, the backup command program 511 writes it into the LU before issuing a backup command.

The LVM (Logical Volume Management) program 508 is a program for providing the function of being able to treat multiple LUs as one virtual LU.

The initiator program 509 is a program for exchanging data with the target program 116 of the storage subsystem 106 using the iSCSI protocol. The initiator program 509 is used for accessing the data of the internal LU 1203 of the storage subsystem 106 (refer to FIG. 12).

FIG. 8 is a block diagram of an example of the LVM-LU management table 510 in the first embodiment of this invention.

The LVM-LU management table 510 includes an LVM-LUN 600, a target name 302, an IP address 303, a port number 304, and an external LUN 305.

The LVM-LUN 600 stores the identifiers for the host 100 to uniquely identify the LVM-LUNs.

The target name 302 stores the iSCSI target names allocated to the LUs.

The IP address 303 stores the IP addresses of the host I/Fs 108 allocated to the iSCSI targets.

The port number 304 stores the TCP port number of the IP addresses to be used by the target program 116 when communicating with the initiator program 509.

Figure 9:
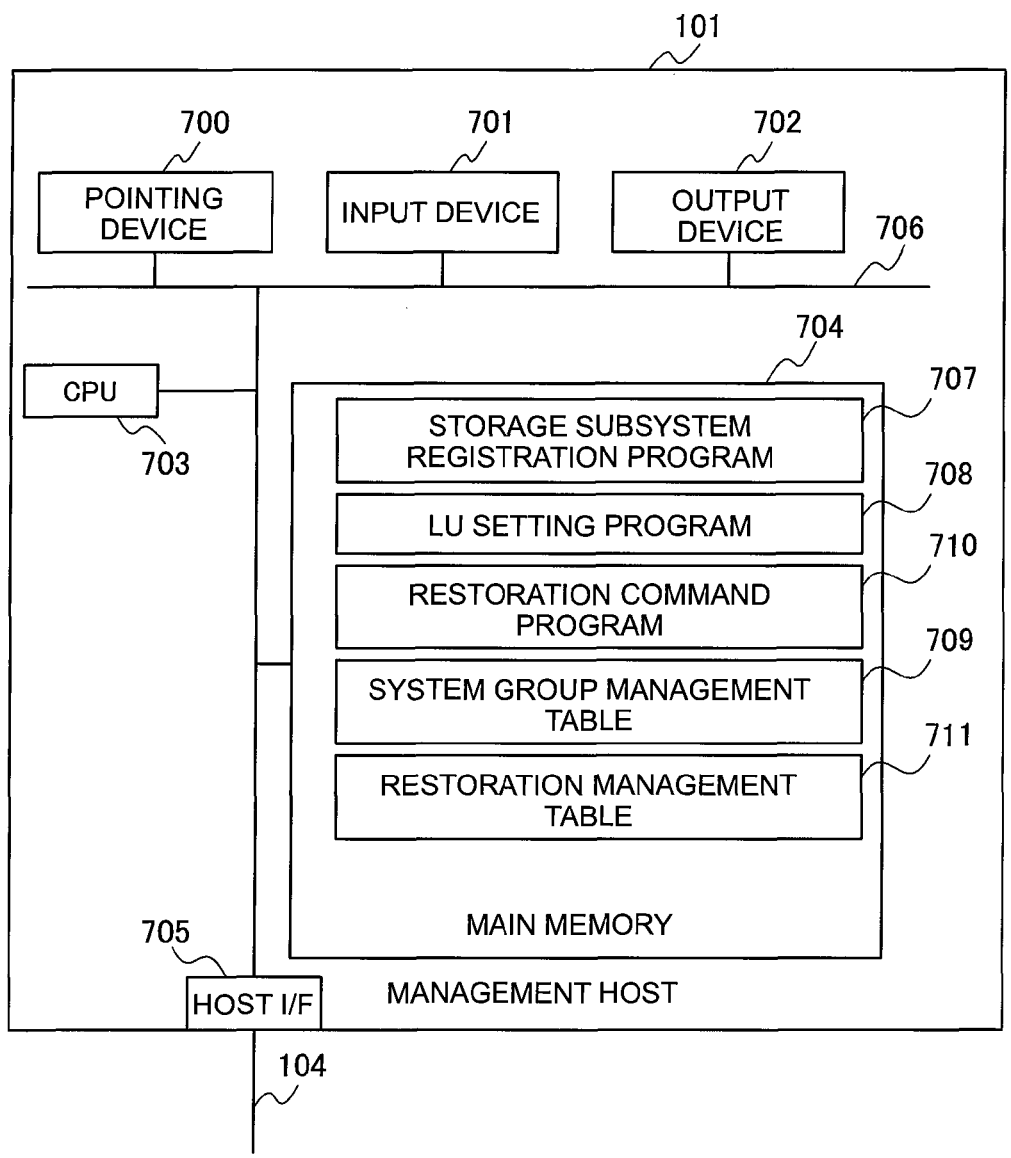
FIG. 9 is a block diagram showing a configuration example of the management host in the first embodiment of this invention.

FIG. 9 is a block diagram showing a configuration example of the management host 101 in the first embodiment of this invention.

The management host 101 includes a pointing device 700, an input device 701, an output device 702, a CPU 703, a main memory 704, and a management host I/F 705. In the management host 101, the pointing device 700, the input device 701, the output device 702, the CPU 703, the main memory 704, and the management host I/F 705 are connected with each other, for example, by a bus 706.

The pointing device 700 and the input device 701 send the information input by the administrator to the CPU 703. For example, the pointing device 700 is a mouse, and the input device 701 is a keyboard.

The output device 702 outputs the information specified by the CPU 703. For example, the output device 702 is a liquid crystal display.

The CPU 703 executes the programs stored in the main memory 704.

The main memory 704 stores a storage subsystem registration program 707, an LU setting program 708, a restoration command program 710, a system group management table 709, and a restoration management table 711.

The management host I/F 705 is a network device for communicating with the storage subsystem 106; for example, the management host 101 communicates with the storage subsystem 106 using the TCP/IP protocol applied to the management host I/F 705.

The storage subsystem registration program 707 is a program for displaying the GUI (Graphic User Interface) for obtaining the information from the administrator required for the management host 101 to communicate with the storage subsystem 106.

The LU setting program 708 is a program for setting the LUs configuring the LVM-LU in the storage subsystem 106.

The restoration command program 710 is a program for issuing restoration commands to the backup control program 123.

The system group management table 709 is a table for managing the information input by the administrator when the storage subsystem registration program 707 is executed.

The restoration management table 711 is a table for storing the settings for performing restoration.

Figure 10:
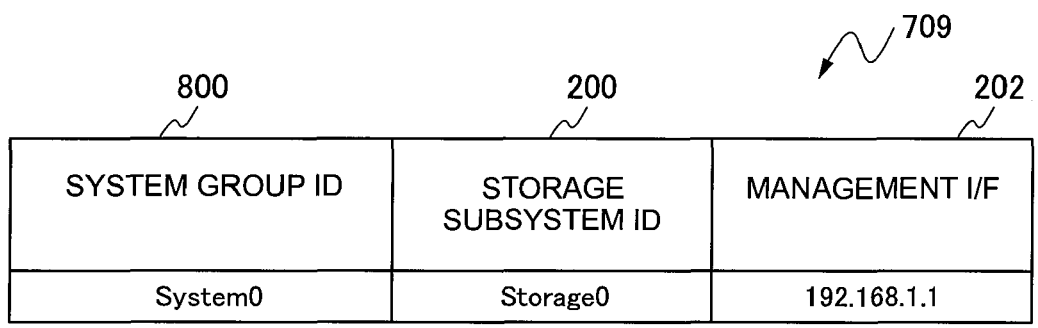
FIG. 10 is a diagram showing an example of the system group management table in the first embodiment of this invention.

FIG. 10 is a diagram showing an example of the system group management table 709 in the first embodiment of this invention.

The system group management table 709 includes a system group ID 800, a storage subsystem ID 200, and a management I/F 202.

The system group ID 800 stores the identifier for uniquely identifying the relevant group in the computer system when the storage subsystem 106 is managed in groups.

Figure 11:
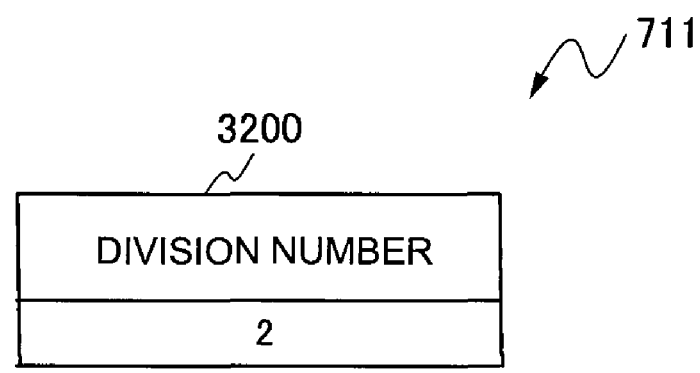
FIG. 11 is a diagram showing an example of the restoration management table in the first embodiment of this invention.

FIG. 11 is a diagram showing an example of the restoration management table in the first embodiment of this invention.

The restoration management table 711 includes a division number 3200. The division number 3200 stores the maximum number of divisions when dividing an LU which is the restoration destination.

Next, the overview of the first embodiment is described.

Figure 12:
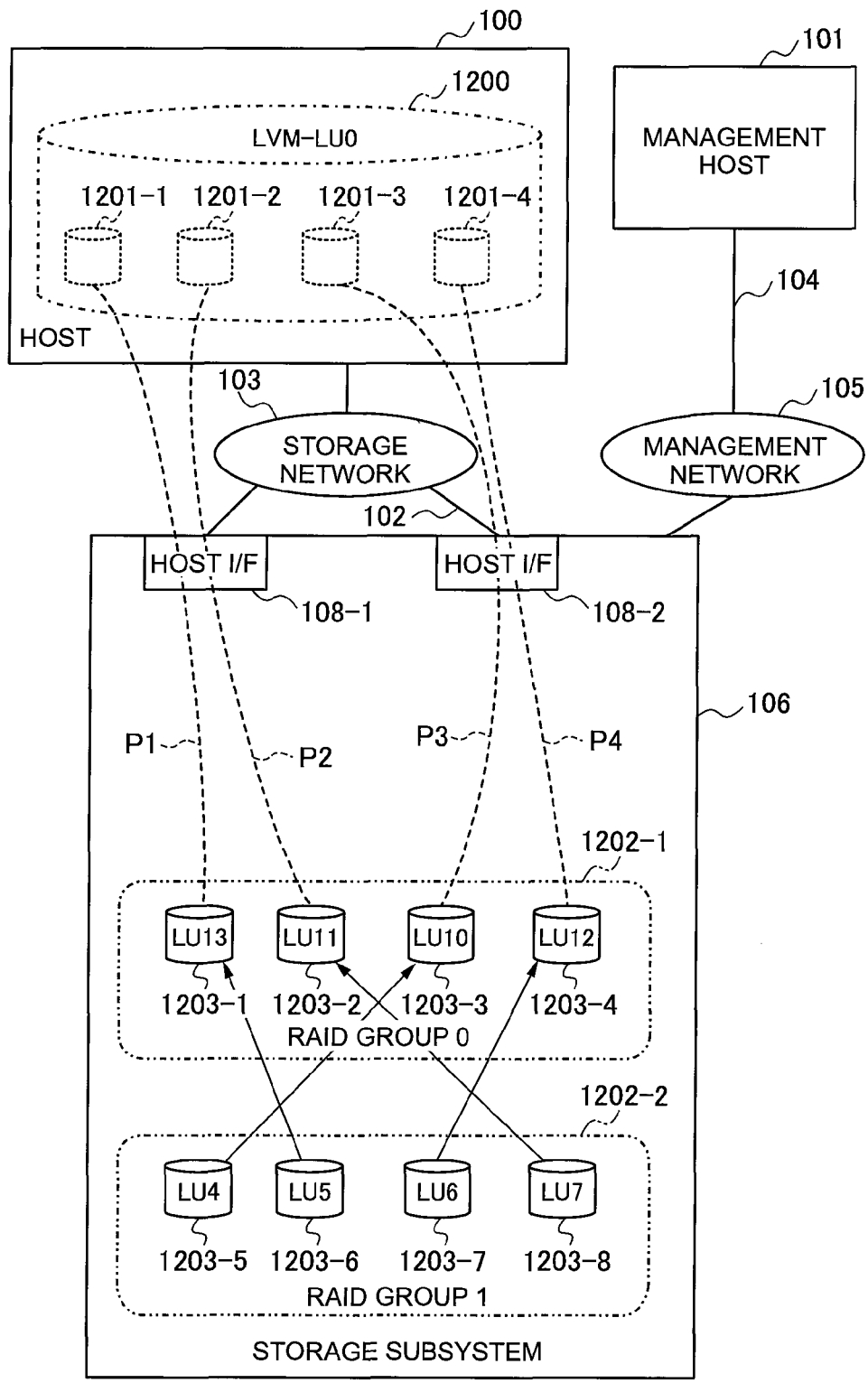
FIG. 12 is a diagram showing an example of the configuration of an LVM-LU and an example of the load distribution processing in the first embodiment of this invention.

FIG. 12 is a diagram showing an example of the configuration of an LVM-LU and an example of the load distribution processing in the first embodiment of this invention. Hereinafter, the LU configuring the LVM-LU 1200 created in the host 100 is referred to as a C-LU (Component-LU) 1201.

The storage subsystem 106 shown in FIG. 12 includes a RAID group 0 (1202-1) and a RAID group 1 (1202-2) both configured of multiple disks 115.

The RAID group 0 (1202-1) includes LUs 1203 (1203-1 to 1203-4) which are the logical storage areas created from the physical storage area of the RAID group 0 (1202-1). Similarly, in the RAID group 1 (1202-2), LUs 1203 (1203-5 to 1203-8) are created. Hereinafter, the LUs 1203 are also referred to as internal LUs 1203.

Internal LUNs 301 are allocated to the internal LUs 1203. More specifically, an internal LUN 301 "LU 13" is allocated to the internal LU 1203-1, an internal LUN 301 "LU 11" is allocated to the internal LU 1203-2, an internal LUN 301 "LU 10" is allocated to the internal LU 1203-3, an internal LUN 301 "LU 12" is allocated to the internal LU 1203-4, an internal LUN 301 "LU 4" is allocated to the internal LU 1203-5, an internal LUN 301 "LU 5" is allocated to the internal LU 1203-6, an internal LUN 301 "LU 6" is allocated to the internal LU 1203-7, and an internal LUN 301 "LU 7" is allocated to the internal LU 1203-8.

The host 100 shown in FIG. 12 includes an LVM-LU 1200 created of C-LUs 1201 as the access source LUs specified by the host 100. More specifically, an LVM-LU 1200 configured of a C-LU 1201-1, a C-LU 1201-2, a C-LU 1201-3, and a C-LU 1201-4 is created.

The correspondence of the respective C-LUs 1201 and the internal LUs 1203 is established. More specifically, the C-LU 1201-1 has the internal LU 1203-1 as a target, the C-LU 1201-2 has the internal LU 1203-2 as a target, the C-LU 1201-3 has the internal LU 1203-3 as a target, and the C-LU 1201-4 has the internal LU 1203-4 as a target.

Furthermore, the C-LUs 1201 (C-LU 1201-1 to C-LU 1201-4) access the internal LUs 1203 (internal LU 1203-1 to internal LU 1203-4) via the host I/Fs 108. That is, between the access source C-LUs 1201 specified by the host 100 (C-LU 1201-1 to C-LU 1201-4) and the access destination internal LUs 1203 specified by the access request from the host 100 (internal LU 1203-1 to internal LU 1203-4), the paths P1 to P4 are created with the host I/Fs 108 as the relay units.

In this case, as shown in FIG. 2, as the bandwidth used by the host I/F 108-1 is larger than that of the host I/F 108-2, the host I/F 108-1 has a larger load than the host I/F 108-2.

Therefore, it is specified to continuously measure the bandwidth of the host I/F 108-1 and the host I/F 108-2 as load information, store the measured load information at the time of backup, and at the time of restoration, distribute the load of the host I/F 108-1 and the host I/F 108-2 with reference to the stored load information. For example, if the paths P1 to P4 are set unevenly between the host I/F 108-1 and the host I/F 108-2, the paths P1 to P4 are, as shown in FIG. 12, set evenly for the host I/F 108-1 and the host I/F 108-2.

Load distribution processing can be performed at the time of restoration because the LVM-LU 1200 comprises multiple C-LUs 1201, and at the same time, the host I/F bandwidth is monitored for each internal LU 1203.

The method of creating an LVM-LU 1200 is described below.

Firstly, the administrator starts up the storage subsystem registration program 707, and registers the storage subsystem 106 of the computer system.

Though not shown in the drawings, the administrator inputs the system group ID 800 and the IP address 303 allocated to the management I/F 109 of the storage subsystem 106 to be registered to the storage subsystem registration screen that is displayed by starting up the storage subsystem registration program 707.

The storage subsystem registration program 707 requires the storage subsystem ID 200 of the system control program 117 of the storage subsystem 106 using the input IP address 303.

The system control program 117 refers to the storage subsystem management table 120, and sends the response including the storage subsystem ID 200 to the storage subsystem registration program 707.

Next, the storage subsystem registration program 707 registers the system group ID 800 and the IP address 303 input by the administrator and the storage subsystem ID 200 obtained from the storage subsystem 106 to the system group management table 709.

Next, the administrator creates C-LUs 1201 to configure an LVM-LU 1200 in the storage subsystem 106 using the LU setting program 708.

The computer system in the first embodiment creates multiple C-LUs 1201, and the application program 507 accesses the LVM-LU 1200 configured from the multiple C-LUs 1201.

Firstly, the processing of creating C-LUs 1201; that is, creating internal LUs 1203 is described.

Figure 13:
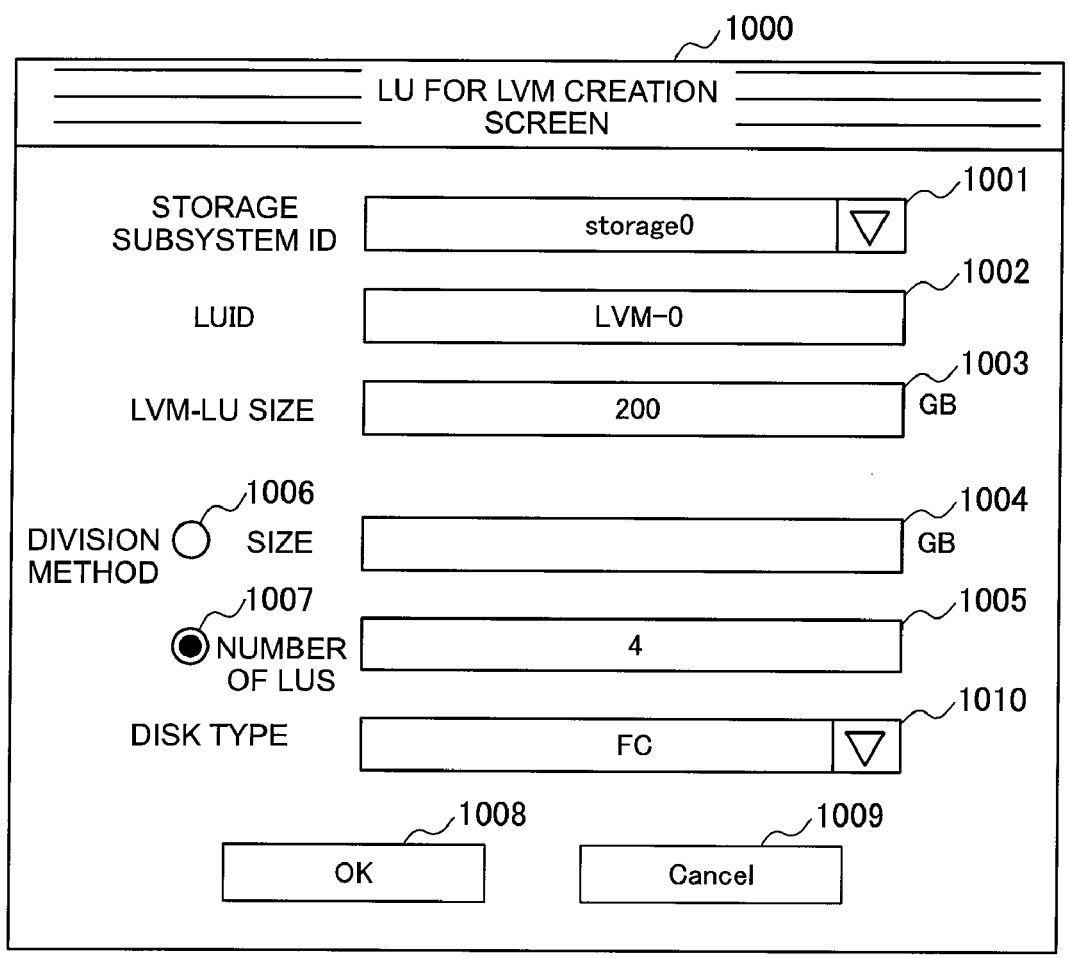
FIG. 13 is a diagram showing an example of the LU creation screen for LVM in the first embodiment of this invention.

The C-LU 1201 creation processing is performed with reference to the information input to the LU creation screen for LVM 1000 (refer to FIG. 13). The LU creation screen for LVM 1000 is described below.

FIG. 13 is a diagram showing an example of the LU creation screen for LVM 1000 in the first embodiment of this invention.

The LU creation screen for LVM 1000 comprises a storage subsystem ID 1001, an LU ID 1002, an LVM-LU size 1003, a division method (size 1006) with the input area 1004, a division method (number of LUs 1007) with the input area 1005, a disk type 1010, an OK button 1008, and a cancel button 1009.

The storage subsystem ID 1001 is a pull-down menu which refers to the system group management table 709 and displays the registered storage subsystem IDs 200 as alternatives.

The LU ID 1002 is a text area for inputting the LU ID.

The LVM-LU size 1003 is a text area for inputting the size of the LVM-LU 1200 to be created.

The division method shows the method of dividing the LVM-LU 1200 into C-LUs 1201. The division method includes the size 1006 and the number of LUs 1007. The size 1006 has the input area 1004 for inputting the size, and the number of LUs 1007 has the input area 1005 for inputting the number of LUs.

The size 1006 is the method of dividing the LVM-LU 1200 into C-LUs 1201 by the size specified in the input area 1004, and the number of LUs 1007 is the method of dividing the LVM-LU 1200 into C-LUs 1201 of the number specified in the input area 1005. The administrator selects either method, and divides the LVM-LU 1200 into C-LUs 1201.

For example, for dividing the LVM-LU 1200 whose LVM-LU size 1003 is "200 GB" into four C-LUs1201, the number of LUs 1007 is selected as the division method, and "4" is input to the input area 1005.

The disk type 1010 selects the type of the disk configuring the C-LUs 1201.

The OK button 1008 is a button for determining the contents of the C-LU creation.

The cancel button 1009 is a button for canceling the C-LU creation processing.

The administrator inputs the required information to all the items and clicks the OK button 1008, which creates C-LUs 1201. The details of the C-LU 1201 creation processing are described below.

Figure 14:
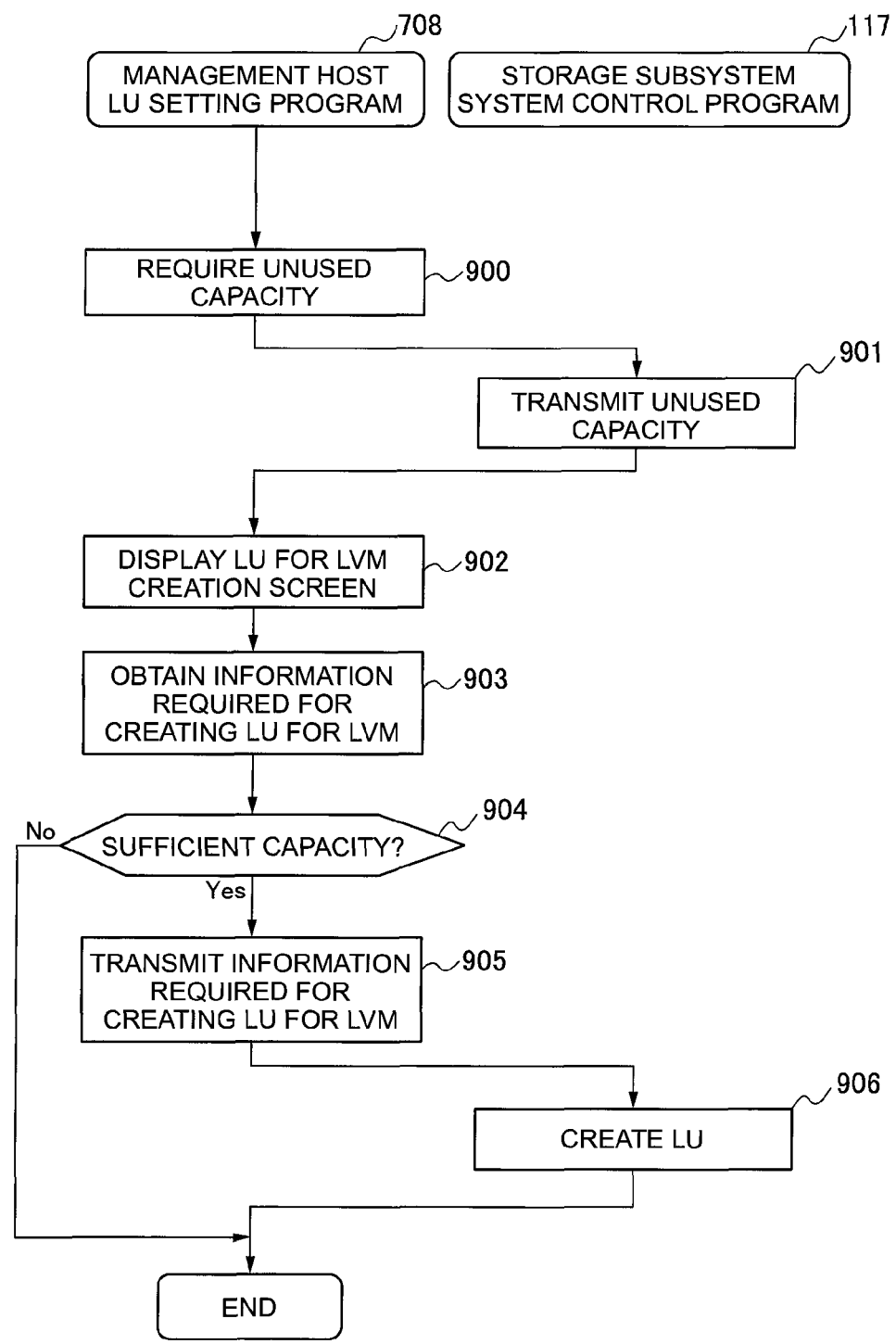
FIG. 14 is a flowchart showing the processing of creating a C-LU in the first embodiment of this invention.

FIG. 14 is a flowchart showing the processing of creating a C-LU 1201 in the first embodiment of this invention.

The following processing is performed if the administrator starts up the LU setting program 708.

The LU setting program 708 of the management host requests the system control program 117 of the storage subsystem 106 registered in the system group management table 709 for the unused capacity 201 (900).

The system control program 117, when receiving the request for the unused capacity 201, refers to the storage subsystem management table 120 and sends the unused capacity 201 to the LU setting program 708 (901).

The LU setting program 708 receives the unused capacity 201 from the system control program 117, and displays the LU creation screen for LVM 1000 on the output device 702 (902).

The LU setting program 708 obtains the information required for creating C-LUs 1201 (903). More specifically, the administrator uses the LU creation screen for LVM 1000 displayed on the output device 702, selects the storage subsystem ID 200 for creating C-LUs 1201, and inputs the LU ID 306 and the size of the LVM-LU.

Next, the administrator selects the method of dividing the LVM-LU 1200 into C-LUs 1201, inputs the information required for the division method, and clicks the OK button 1008.

The LU setting program 708 refers to the unused capacity 201 obtained from the storage subsystem 106, and determines whether the LVM-LU 1200 of the input LVM-LU size 1003 can be created or not (905).

If the LVM-LU 1200 of the input LVM-LU size 1003 is determined to be impossible to create, the LU setting program 708 reports the error message displayed on the output device 702 that the capacity is insufficient to the administrator, and completes the processing.

If the LVM-LU 1200 of the input LVM-LU size 1003 is determined to be possible to create, the LU setting program 708 sends the information required for creating C-LUs 1201 to the system control program 117 (905).

The system control program 117, when receiving the information required for creating C-LUs 1201, creates the LUs 1203 of the specified size (refer to FIG. 12) in the RAID group 1202 including the unused area (refer to FIG. 12), allocates the target name 302, the IP address 303, the port number, and the external LUN 305 to the created LUs 1203, and registers the correspondences of the RAID group ID 300 and the LU ID 306 of the RAID group where the LUs 1203 are created in the LU management table 121 (906). However, as for the LU IDs 306, the values input to the LU ID 1002 are stored.

The system control program 117 includes the LU IDs 306 in the target names 302 allocated to the internal LUs 1203. Furthermore, the target names 302 are allocated, for example, so as to be a globally unique name, including the identifier of the storage subsystem 106 and others. The system control program 117, when allocating the IP addresses 303, refers to the load management table 122, and can either select the IP address 303 with the smallest sum of the host I/F bandwidth 400 or make the administrator specify the IP address using the LU creation screen for LVM 1000.

By the above-mentioned steps, LUs 1203 configuring an LVM-LU 1200 can be created in the storage subsystem 106. Note that the LUs 1203 configuring an LVM-LU 1200 created in the storage subsystem 106 are recognized by the initiator program 509 as the iSCSI target.

Next, the processing of creating an LVM-LU 1200 is described below.

Figure 15:
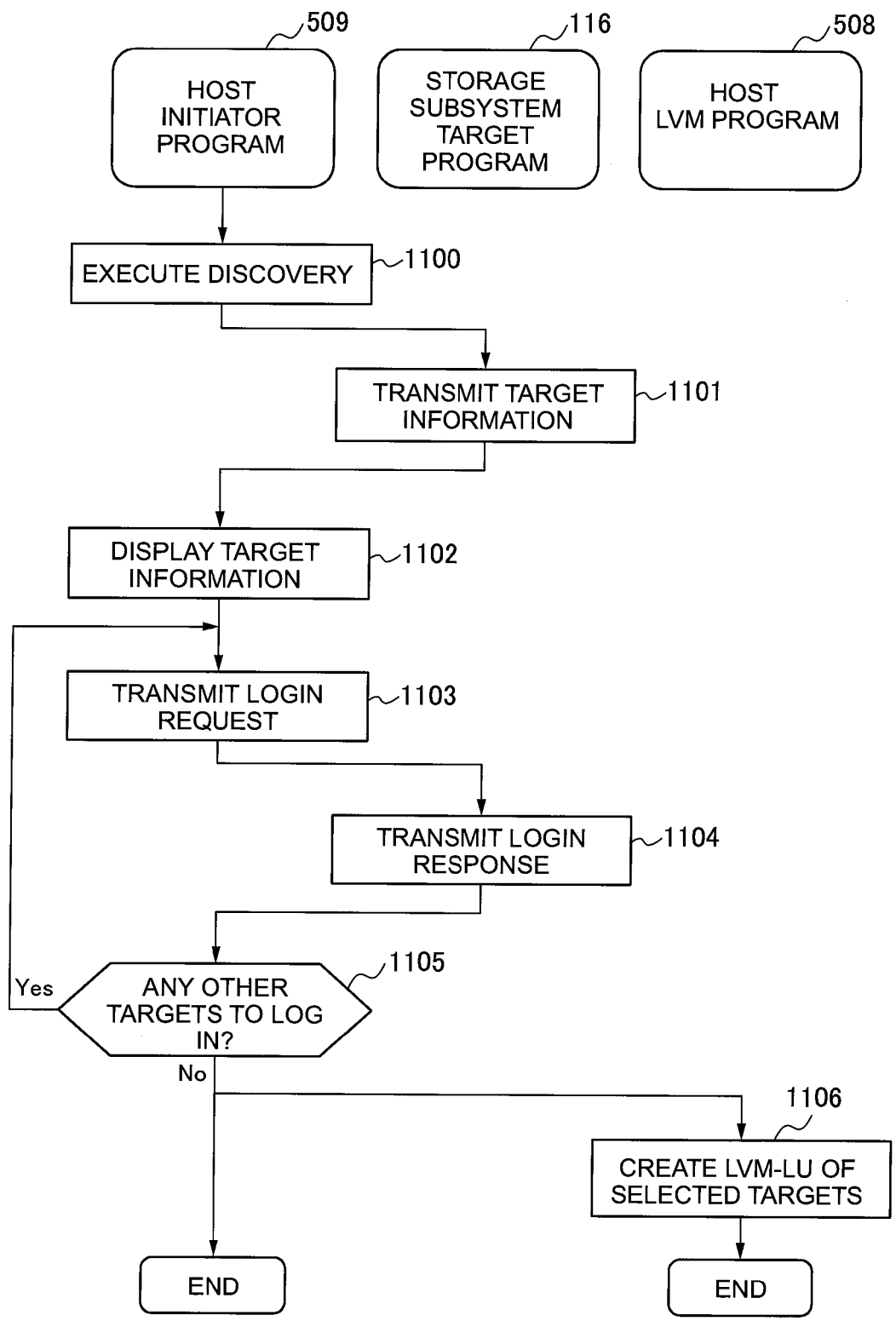
FIG. 15 is a flowchart showing the processing of creating an LVM-LU in the first embodiment of this invention.

FIG. 15 is a flowchart showing the processing of creating an LVM-LU 1200 in the first embodiment of this invention.

The initiator program 509 of the host 100 starts a discovery session by issuing a SendTargets command to the iSCSI target connected with the storage network 103, and waits for a response from the iSCSI target (1100).

The target program 116 of the storage subsystem 106, when receiving the SendTargets command, sends the target information including the target name 302, the IP address 303, the port number 304 and the external LUN 305 to the initiator program 509 (1101).

The initiator program 509, when receiving the target information, displays the received target information on the output device 502 (1102). The administrator recognizes and selects all the iSCSI targets configuring the LVM-LU 1200 from the target names 302 displayed on the output device 502, and issues a command for starting the login processing to the initiator program 509. The initiator program 509, when receiving the command from the administrator, sends the login request to the selected iSCSI target (1103).

The target program 116, when receiving the login request, performs the login processing, and sends the completion report of the relevant processing to the initiator program 509 (1104). Note that, when logging in, the target program 116 authenticates the initiator program 509 making the login request using, for example, CHAP (Challenge Handshake Authentication Protocol) or the like.

The initiator program 509 determines whether there are any other iSCSI targets to log in to (1105).

If it determines that there are other iSCSI targets to log in to, the initiator program 509 returns to step 1103 and repeats the same processing.

If it determines that there are no other iSCSI targets to log in to, the initiator program 509 completes the processing.

The administrator starts up the LVM program 508 of the host 100, and creates the LVM-LUs 1200 of all the iSCSI targets to which it has logged in. The LVM program 508 allocates the LVM-LUNs 600 to the created LVM-LUs 1200, and registers the iSCSI target names 302 of the iSCSI targets configuring the LVM-LUs, the IP addresses 303, the port numbers 304, and the external LUNs 305 to the LVM-LU management table 510 (1106).

LVM-LUs 1200 can be created in the host 100 by the above-mentioned method. The application program 507 accesses the logically created LVM-LUs 1200 comprising iSCSI targets.

Next, the processing of monitoring the host I/F 108 bandwidth is described below.

Figure 16:
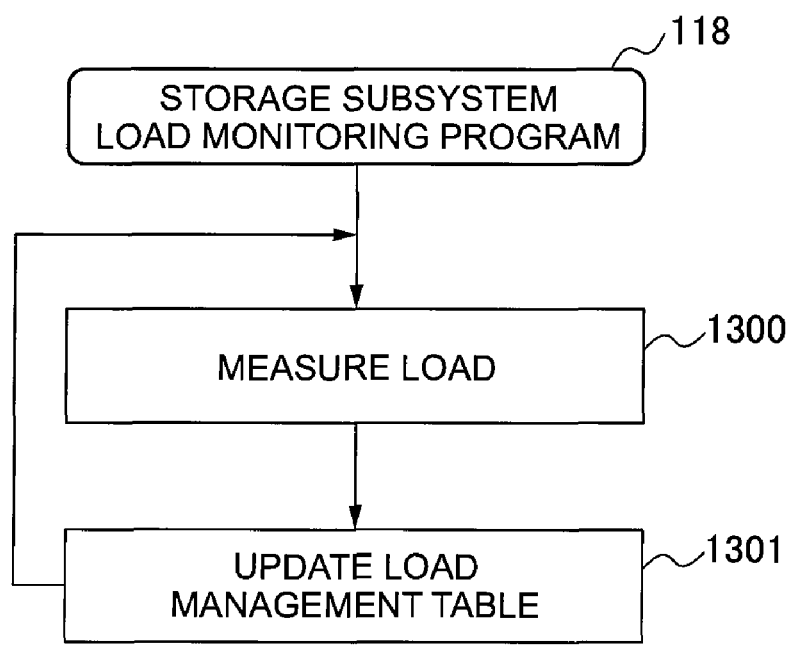
FIG. 16 is a flowchart showing the load monitoring processing in the first embodiment of this invention.

FIG. 16 is a flowchart showing the load monitoring processing in the first embodiment of this invention.

The load monitoring program 118 is, for example, automatically performed after the storage subsystem 106 is powered on, and keeps being performed until the storage subsystem 106 is powered off.

The load monitoring program 118 of the storage subsystem 106 refers to the internal LUNs 301 and the IP addresses 303 of the LU management table 121, and measures the bandwidth used by the host I/Fs 108 per internal LU (1300). The used bandwidth is, for example, the average bps (bit per second) used per week. The load monitoring program 118 measures the average bps (bit per second) used per week, and proceeds to the step 1301.

The load monitoring program 118 registers the RAID group IDs 300, the internal LUNs 301, the IP addresses 303, and host I/F bandwidth 400 of the measured internal LUs to the load management table 122 (1301). After that, the load monitoring program 118 performs the above-mentioned processing periodically, and updates the load management table 122.

By the above-mentioned processing, the bandwidth used by the host I/Fs 108 can be measured per internal LU of the storage subsystem 106.

Figure 17:
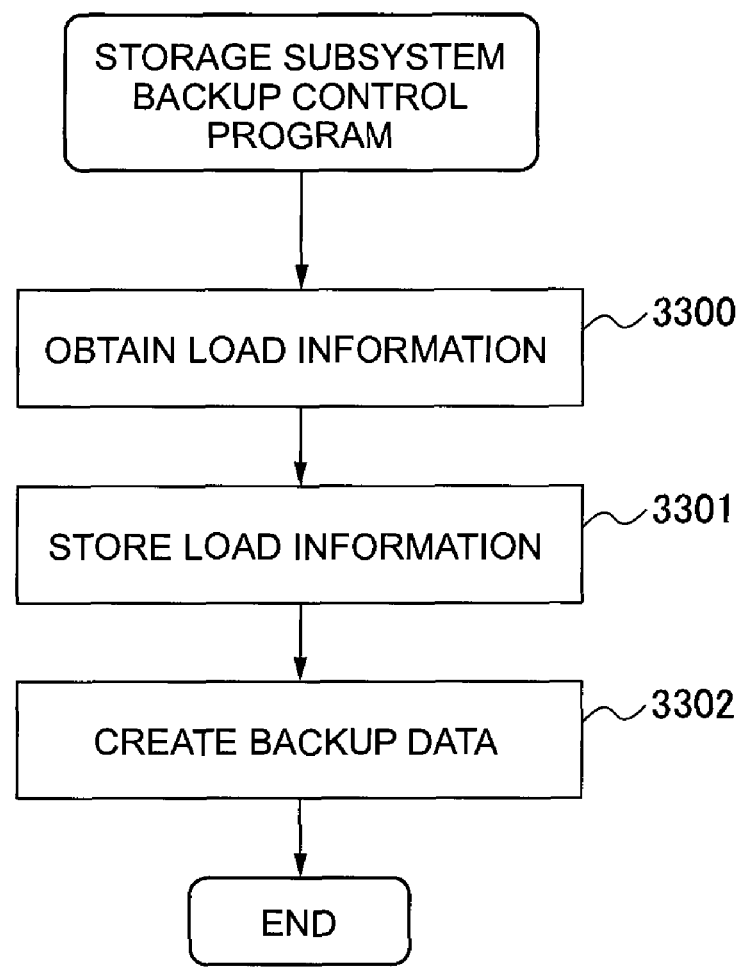
FIG. 17 is a flowchart showing the backup processing in the first embodiment of this invention.

FIG. 17 is a flowchart showing the backup processing in the first embodiment of this invention.

The backup control program 123 is performed when a backup command from the backup command program 511 of the host 100 is received.

The backup control program 123 obtains the host I/F bandwidth corresponding with the LUs as the backup targets from the load management table 122 (refer to FIG. 4) (3300).

The backup control program 123 stores the obtained host I/F bandwidth in the host I/F bandwidth of the copy pair management table 125 (refer to FIG. 6) (3301).

The backup control program 123 stores the storage subsystem IDs 3101, the internal LUNs 3102, the storage subsystem IDs 3104, the internal LUNs 3105, and the backup types 3107 received from the backup command program 511 in the copy pair management table 125. Next, the backup control program 123 copies the data required for the backup from the internal LUNs 3102 to the internal LUNs 3105 (3302).

FIG. 18 is a diagram showing an example of the restoration command screen in the first embodiment of this invention.

The restoration command screen 3400 comprises a purpose 3401, an emergency level 3402, an iSCSI initiator name 3403, a restoration ID 3404, a target 3405, an LU ID 3406, a date and time 3407, a backup type 3408, an OK button 3409, and a cancel button 3410.

The purpose 3401 shows the purpose of performing the restoration. The administrator selects "test" if the purpose is a planned restoration, or "data recovery" if recovery from the data loss due to a certain failure is the purpose.

The emergency level 3402 shows the emergency level of the restoration to be performed. "High" is selected if the emergency level is high, or "low" if the emergency level is low.

The iSCSI initiator name 3403 inputs the iSCSI initiator name of the initiator program 509 of the host 100 to be accessed after the restoration. No input to the iSCSI initiator name 3403 is required if it is not changed from the time of the backup. It is also possible to store and display the past input history.

The restoration ID 3404 shows the ID for the administrator to uniquely identify the restoration destination.

The target 3405 is a checkbox for selecting the restoration destination. The administrator checks the target 3405 of the restoration destination.

The LU ID 3406 shows the LU IDs 306 of the obtained LU management table 121 corresponding with the internal LUNs 3102 of the PVOL in the obtained copy pair management table 125. The restoration command program 710 associates the copy pair management table 125 with the LU management table 121 in the internal LUN 3102 and in the internal LUNs 301.

The date and time 3407 shows the date and time 3106 of the obtained copy pair management table 125 corresponding with the internal LUNs 3102 of the PVOL.

The backup type 3408 shows the backup types 3107 of the obtained copy pair management table 125 corresponding with the internal LUNs 3102 of the PVOL.

The OK button 3409 is a button for determining the restoration command. The cancel button 3410 is a button for canceling the settings for the restoration command.

Figure 19A:
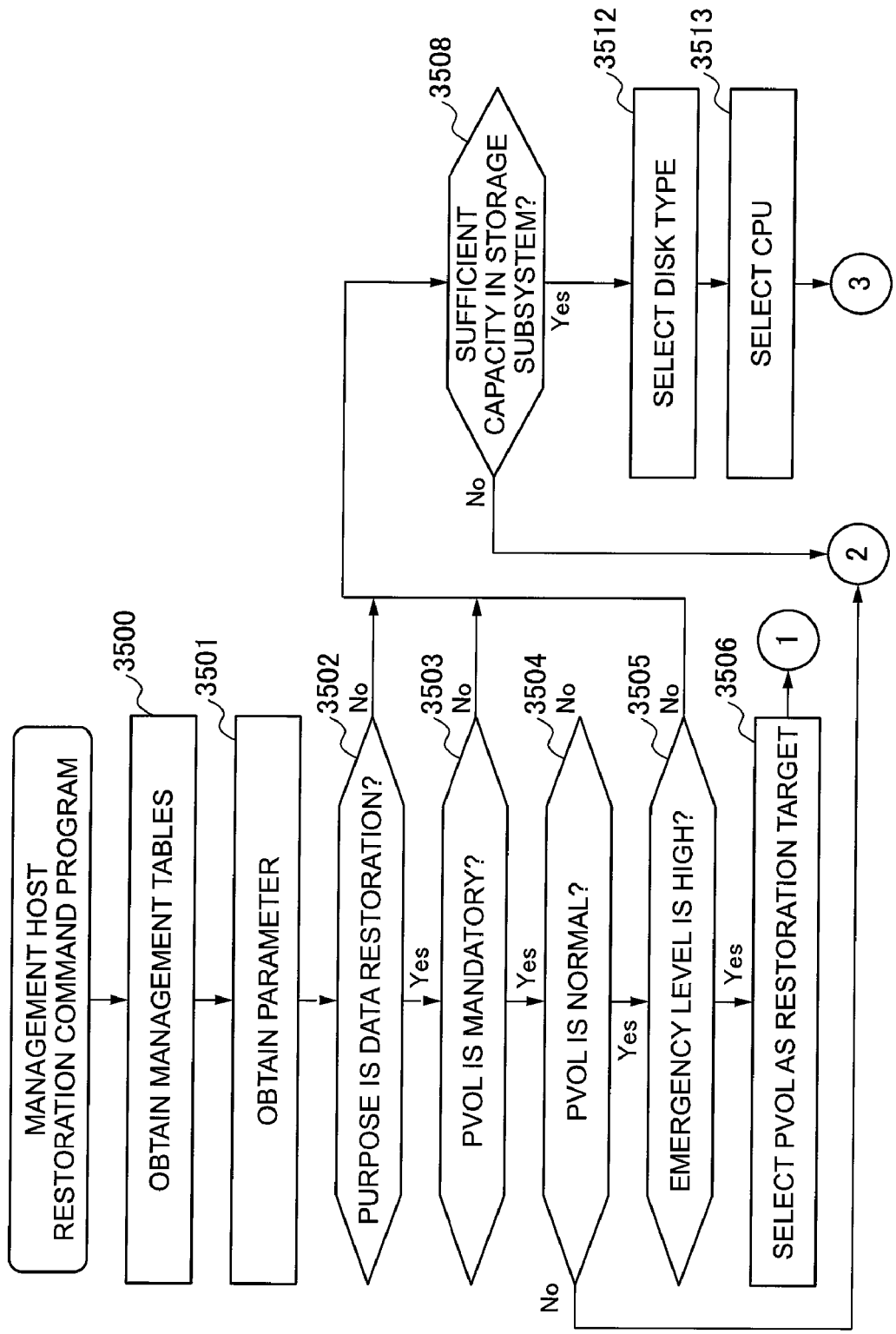
FIG. 19A is a flowchart showing the restoration processing in the first embodiment of this invention.
Figure 19B:
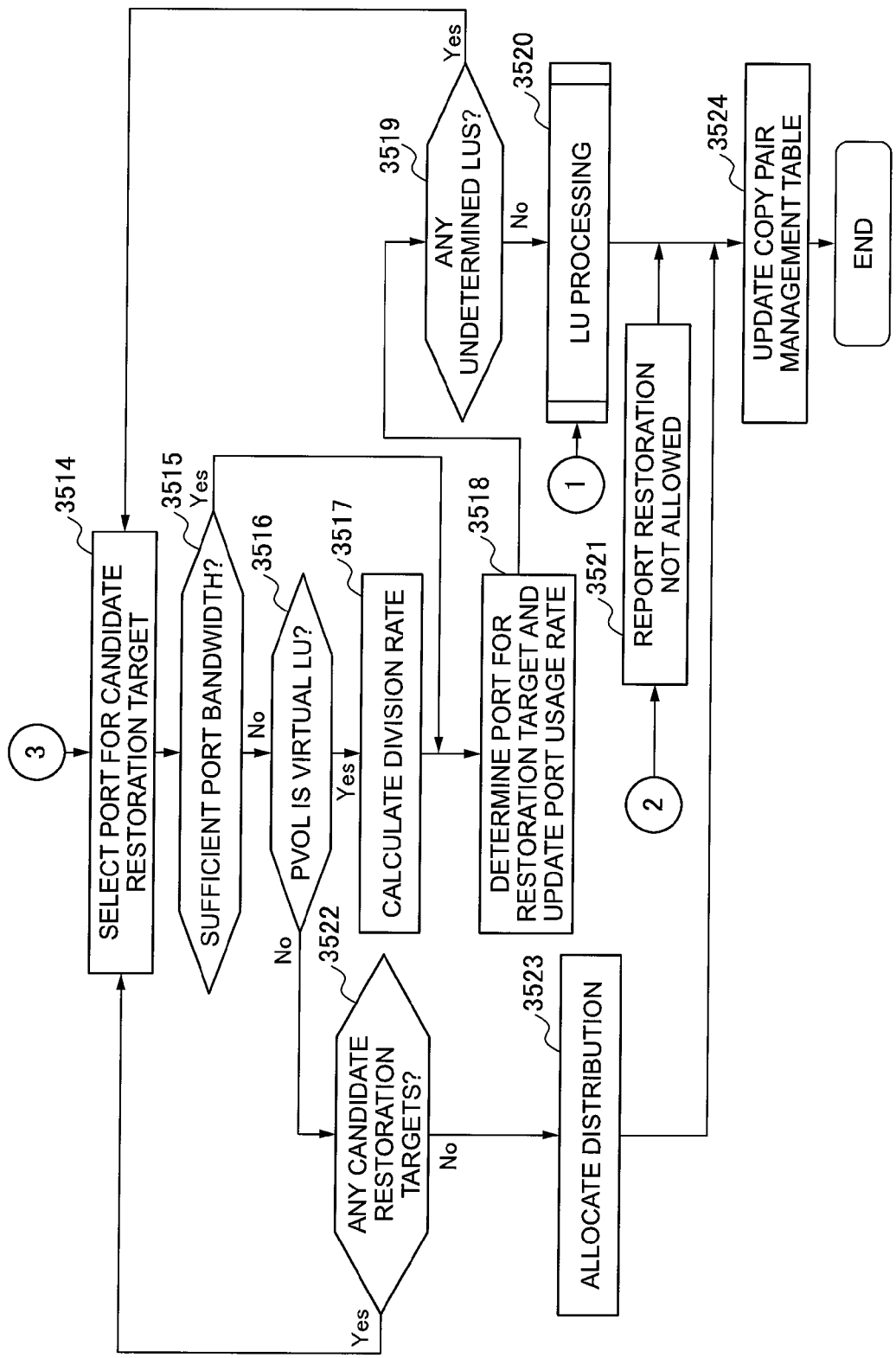
FIG. 19B is a flowchart showing the restoration processing in the first embodiment of this invention.

FIGS. 19A and 19B are flowcharts showing the restoration processing in the first embodiment of this invention.

The restoration command program 710 is performed when the administrator starts up this program.

The restoration command program 710 obtains the LU management table 121, the load management table 122, the security management table 124, and the copy pair management table 125 from the storage subsystem registered in the system group management table 709 (3500).

When the OK button is pressed, the restoration command program 710 obtains the restoration settings specified by the administrator (3501).

The restoration command program 710 determines whether the purpose of the restoration is data restoration or not (3502).

If data restoration is determined to be the purpose, the restoration command program 710 performs the processing of step 3503.

If data restoration is determined not to be the purpose, the restoration command program 710 performs the processing of step 3508.

The restoration command program 710 refers to the backup type of the obtained copy pair management table 125, and determines whether the PVOL is required or not (3503).

If the backup type is "full" (full backup) and the PVOL is determined not to be required, the restoration command program 710 performs the processing of step 3508.

If the backup type is other than "full" and the PVOL is determined to be required, that is, if the backup type is "differential" or "incremental" and the PVOL is determined to be required, the restoration command program 710 performs the processing of step 3504.

The restoration command program 710 refers to the obtained LU management table 121, and determines whether the PVOL is normal or not (3504).

If the PVOL is determined to be normal, the restoration command program 710 performs the processing of step 3505.

If the PVOL is determined to be abnormal, the restoration command program 710 performs the processing of step 3521.

The restoration command program 710 determines whether the obtained emergency level is high or low (3505).

If the emergency level is determined to be high, the restoration command program 710 performs the processing of step 3506.

If the emergency level is determined not to be high, the restoration command program 710 performs the processing of step 3508.

When the emergency level is high, the restoration command program 710 selects the PVOL as the restoration destination, and then performs the processing of step 3520 (3506).

If "No" is selected at step S3502, S3503 or S3505, the restoration command program 710 determines whether the unused capacity of the storage subsystem 106 is sufficient for the size of the PVOL (3508).

If the unused capacity of the storage subsystem 106 is determined to be sufficient for the size of the PVOL, the restoration command program 710 limits the storage subsystems 106 as the restoration destinations to the storage subsystems 106 with the sufficient unused capacity, and performs the processing of step 3512.

If the unused capacity of the storage subsystem 106 is determined to be insufficient for the size of the PVOL, the restoration command program 710 performs the processing of step 3521.

The restoration command program 710 checks whether there is unused capacity of the size of the PVOL in the same disk type as the PVOL, and if there is unused capacity, determines the same disk type as the PVOL as the disk type of the restoration destination. If there is no unused capacity, the program determines the different disk type from the PVOL as the disk type of the restoration destination (3512).

The restoration command program 710 refers to the CPU usage rate 205 of the obtained storage subsystem management table 120, and determines, from among the multiple CPUs 110, the CPU 110 with the lowest CPU usage rate as the CPU 110 to perform the processing related to the LU as the restoration destination (3513).

The restoration command program 710, from among the host I/Fs 108 remaining as the candidate restoration destinations, selects the host I/F 108 with the lowest port usage rate as the target port. Next, the restoration command program 710, from among the restoration source LUs whose restoration destination ports are not determined yet, selects the LU with the largest host I/F bandwidth 3108 as the target LU (3514).

The restoration command program 710 determines whether the unused bandwidth of the target port is larger than the host I/F bandwidth of the target LU and the port bandwidth is sufficient or not (3515).

If the bandwidth is determined to be sufficient, the restoration command program 710 performs the processing of step 3518.

If the port bandwidth is determined not to be sufficient, the restoration command program 710 performs the processing of step 3516.

The restoration command program 710 refers to the LU IDs 306 in the obtained LU management table, and determines whether the PVOL of the restoration destination is the LU configuring the LVM-LU (3516). If the head of the LU ID 306 is LVM, it is determined to be an LVM-LU, and if the head is other than the LVM, it is determined not to be an LVM-LU.

If the LU is determined to be configuring the LVM-LU, the restoration command program 710 performs the processing of step 3517.

If the LU is determined not to be configuring the LVM-LU, the restoration command program 710 performs the processing of step 3522.

If any storage subsystem 106 as a candidate restoration destination still remains, the restoration command program 710 calculates the division rate which is the rate of the target port to the host I/F bandwidth 3108 of the target LU (3517).

The restoration command program 170 temporarily divides the target LU by the calculated division rate. The temporary division does not mean actually dividing the target LUs but treating the target LU as divisions in the processing, for the purpose of determining the restoration destination port of the restoration destination LU in this restoration processing. For example, if the unused bandwidth of the target port is 25 Mbps and the target LU whose capacity is 60 GB and whose host I/F bandwidth 3108 is 80 Mbps is to be temporarily divided, the division rate amounts to 25%.

If the target LU is temporarily divided by this division rate, the target LU is divided into the target LU with 15 GB (60×0.25=15 GB) of capacity and 20 Mbps (80×0.25=20 Mbps) of the host I/F bandwidth 3108, and the restoration source LU with 45 GB of capacity, 60 Mbps of the host I/F bandwidth, and to which the restoration destination port is not allocated.

Figure 20:
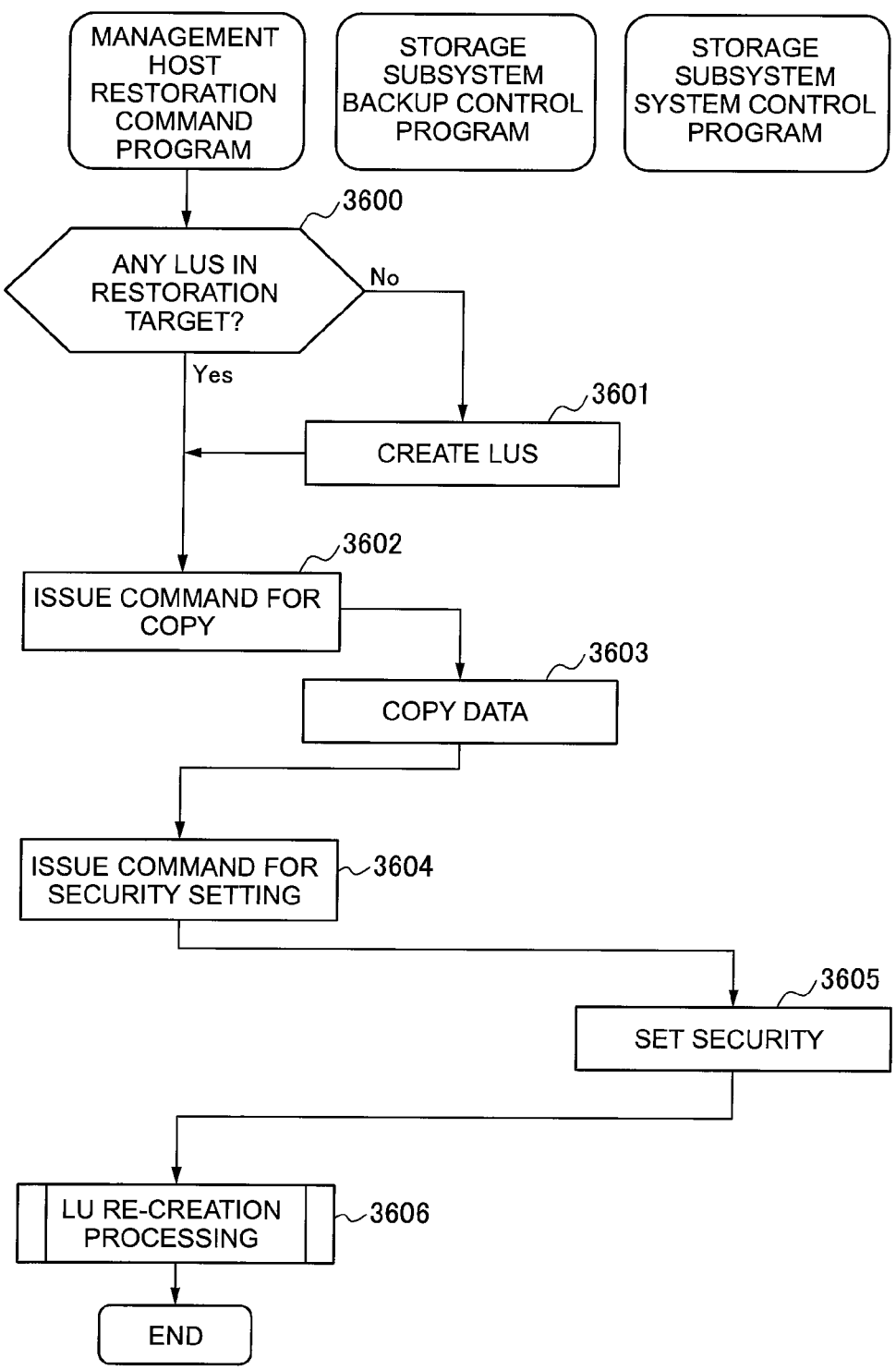
FIG. 20 is a flowchart showing the LU processing in the first embodiment of this invention.

In this case, the LU processing shown in FIG. 20 copies data from the restoration source LU to the restoration destination LU by dividing the restoration destination LU by the calculated rate.

If no storage subsystem as a candidate restoration destination remains, the restoration command program 710 temporarily divides the target LU by the division number 3200 in the restoration management table 711, and determines the temporarily divided target LUs equally for each host I/F 108 of the storage subsystem 106 belonging to the group with the highest priority, as the restoration destination ports.

For example, if there are two host I/Fs 108 and four temporarily divided LUs, two of the temporarily divided LUs are determined for each of the host I/Fs 108. If no storage subsystem 106 as a candidate restoration destination remains, this processing leaves no target LUs with host I/Fs 108 as the restoration destination undetermined.

The restoration command program 710 determines the target port as the restoration destination port of the target LU. Next, the restoration command program 710 adds the host I/F bandwidth 3108 of the target LUs to the used bandwidth 208 in the target port of the obtained storage subsystem management table 120 (3518).

The restoration command program 710 determines whether there are any restoration source LUs corresponding with the restoration destination LUs where host I/Fs 108 allocated to the restoration destination LUs are not determined yet (3519).

If it is determined that there are restoration source LUs with the host I/Fs undetermined, the restoration command program 710 performs the processing of step 3514.

If it is determined that there is no restoration source LU with the host I/F undetermined, the restoration command program 710 performs the processing of step 3520.

The restoration command program 710, in collaboration with the backup control program 123 and the system control program 117 of the storage subsystem 106, performs the LU processing (3520). The details of the LU processing are described later referring to FIG. 20.

The restoration command program 710, though not shown in the drawings, reports to the administrator using the GUI that the restoration is not allowed (3521). Though this embodiment has specified that restoration is not to be allowed if the determination at step 3508 shows no unused capacity, restoration in the PVOL may also be permitted if the emergency level is low. In this case, step 3520 is processed after determining the PVOL as the restoration destination.

The restoration command program 710 compares the storages as candidate restoration destinations by seeing whether the bandwidth 208 used by the host I/F 108 of each storage subsystem reaches the upper limit of the bandwidth 207, and determines whether there are any storage subsystems 106 as candidate restoration destinations including the host I/Fs 108 still with unused bandwidth (3522).

If it is determined that there are storage subsystems 106 as candidate restoration destinations, the restoration command program 710 performs the processing of step 3514.

If it is determined that there is no storage subsystem 106 as a candidate restoration destination, the restoration command program 710 performs the processing of step 3523.

The restoration command program 710 specifies the host I/Fs 108 of the storage subsystem 106 belonging to the group with the highest priority as the restoration ports one by one sequentially, and determines to allocate the remaining target LUs one by one. (3523). If a cycle of allocating target LUs to all the host I/Fs is completed and there are target LUs still remaining, the same processing is repeated; that is, the allocation is performed starting with the host I/Fs 108 of the storage subsystem 106 belonging to the group with the highest priority. As shown in the FIG. 18, if the internal LU4, LU5, LU6, and LU7 whose LU IDs 306 are LVM-0 on condition that the purpose is "test," the emergency level is low, and the initiator name is host1, the host I/F used by the restoration destination LUs of LU5 and LU7 is the host I/F 108-1, and the host I/F used by the restoration destination LUs of LU4 and LU6 is the host I/F 108-2.

If the PVOL is not required after the restoration, the restoration command program 710 can issue a command for deleting the PVOL before completing the restoration processing to the system control program 117.

If the restoration destination is not the PVOL, the restoration command program 710 issues a command for specifying the restoration destination corresponding with the restoration source to be the PVOL to the system control program 117. The system control program 117, when receiving the command, updates the copy pair management table 125 to make the restoration destination the PVOL (3524).

FIG. 20 is a flowchart showing the LU processing in the first embodiment of this invention.

The program confirms with the storage subsystem 106 as the restoration destination whether there are any unused LUs of the same size as the restoration source LUs, and the restoration command program 710 of the management host 101 confirms with the storage subsystem 106 as the restoration destination whether there are any LUs of the same size as the restoration source LUs and to which host I/Fs are not allocated (3600).

If it is determined that there are such LUs, the restoration command program 710 performs the processing of step 3602.

If it is determined that there are no such LUs, the restoration command program 710 issues a command for performing the processing of step 3601 to the backup control program 123. The command includes the LU size and the host I/F 108 of the allocation destination.

The backup control program 123 creates LUs with reference to the received command (3601). In this case, the backup control program 123 registers the information related to the created LUs to the LU management table 121.

The restoration command program 710 issues a copy command to the backup command program 511 of the host 100 (3602).

The backup control program 123, when receiving the command from the backup command program 511, copies the data from the restoration source LUs to the restoration destination LUs (3603).

The restoration command program 710 issues a command for security setting to the system control program 117 (3604). This command includes the iSCSI initiator name 3403 of the host specified on the restoration setting screen which allows access from the host to the restoration destination LU via the host I/F, the iSCSI target name of the restoration destination LU, and the setting information of the group of the host I/Fs allocated to the restoration destination LUs.

The system control program 117 registers the received setting information to the security management table 124 (3605).

The restoration command program 710 issues a command for performing the LVM-LU creation processing shown in FIG. 15 as the LU re-creation processing to the initiator program 509 of the host 100 (3606). At this time, if the PVOL is not a virtual volume, the initiator program 509 does not perform the processing of step 1106. If the PVOL is a virtual volume, the restoration command program 710 sends the LU ID along with the command for the LVM-LU creation processing to the initiator program 509.

As the initiator program 509 sends the LU ID to the LVM program 508, the LVM program 508 can create LVM-LUs automatically without any operation by the administrator.

FIG. 21 is a diagram showing an example of the LU management table 121 after restoration in the first embodiment of this invention.

From among the internal LUNs 301 created by the LU processing 3520, 10 to 13 are registered to the LU management table 121, and the IP addresses of the host I/Fs 108 allocated to the internal LUs which are determined to be the restoration destinations by the restoration processing are stored in the IP address 303.

FIG. 22 is a diagram showing an example of the copy pair management table 125 after restoration in the first embodiment of this invention.

In the restoration processing, if the restoration destination is not the PVOL, as shown in FIG. 22, the restoration destinations corresponding with the internal LUNs 3105 are updated as the PVOL. In this case, 4 to 7 as the internal LUNs 3105 are changed.

FIG. 23 is a diagram showing an example of the storage subsystem management table in the first embodiment of this invention.

If the host I/F usage rate after the restoration is the same as the time of the backup, as shown in FIG. 23, the bandwidth 208 used by the host I/F 108 with the IP address 192.168.0.1 is 50 Mbps, and the bandwidth used by the host I/F 108 with the IP address 192.168.0.2 is 45 Mbps, which shows that the used bandwidth 208 before the restoration shown in FIG. 2 has been distributed.

As mentioned above, the first embodiment can distribute the load of the used bandwidth between the host I/Fs 108 of the storage subsystem 106 at the time of restoration, per LU to be accessed by the application program 507 or per small-capacity internal LU configuring the LVM-LU 1200. This enables the efficient use of the communication I/F of the system; that is, the bandwidth of the host I/F 108, and the provision of the storage subsystem and the computer system which can easily approach its limit performance.

Furthermore, though this embodiment has used only the host I/F bandwidth for determining the target LUs by the restoration command program, it may also be permitted to set the priority level in the internal LU 1203 and determine the restoration source LUs with the high priority to be target LUs preferentially.

Meanwhile, on the LU creation screen for LVM 1000, by making the administrator input the iSCSI initiator names of the hosts 100 to access C-LUs 1201 configuring the LVM-LU 1200, and storing the correspondence of the iSCSI initiator names and the LUs, the iSCSI initiators which can log in to the iSCSI targets allocated to the C-LUs 1201 configuring the LVM-LU 1200 can be limited.

Furthermore, though the LU creation screen for LVM 1000 has made the administrator specify the method of dividing the size of the LVM-LU 1200, the input by the administrator can be omitted from the processing if the division size and the number of LUs are specified in advance.

Though the first embodiment has described a case where the number of C-LUs 1201 configuring the LVM-LU 1200 is "4," the load distribution processing can be optimized by specifying the number of C-LUs 1201 as thousands, and the bandwidth of the host I/F 108 can be used efficiently.

Second Embodiment

Next, the second embodiment of this invention is described below. Note that the following description focuses on the differences from the first embodiment.

The second embodiment distributes the disk I/O load produced by the application program 507 between multiple storage subsystems 106, without deteriorating the limit performance of the system.

Firstly, the overview of the second embodiment is described below.

Figure 24:
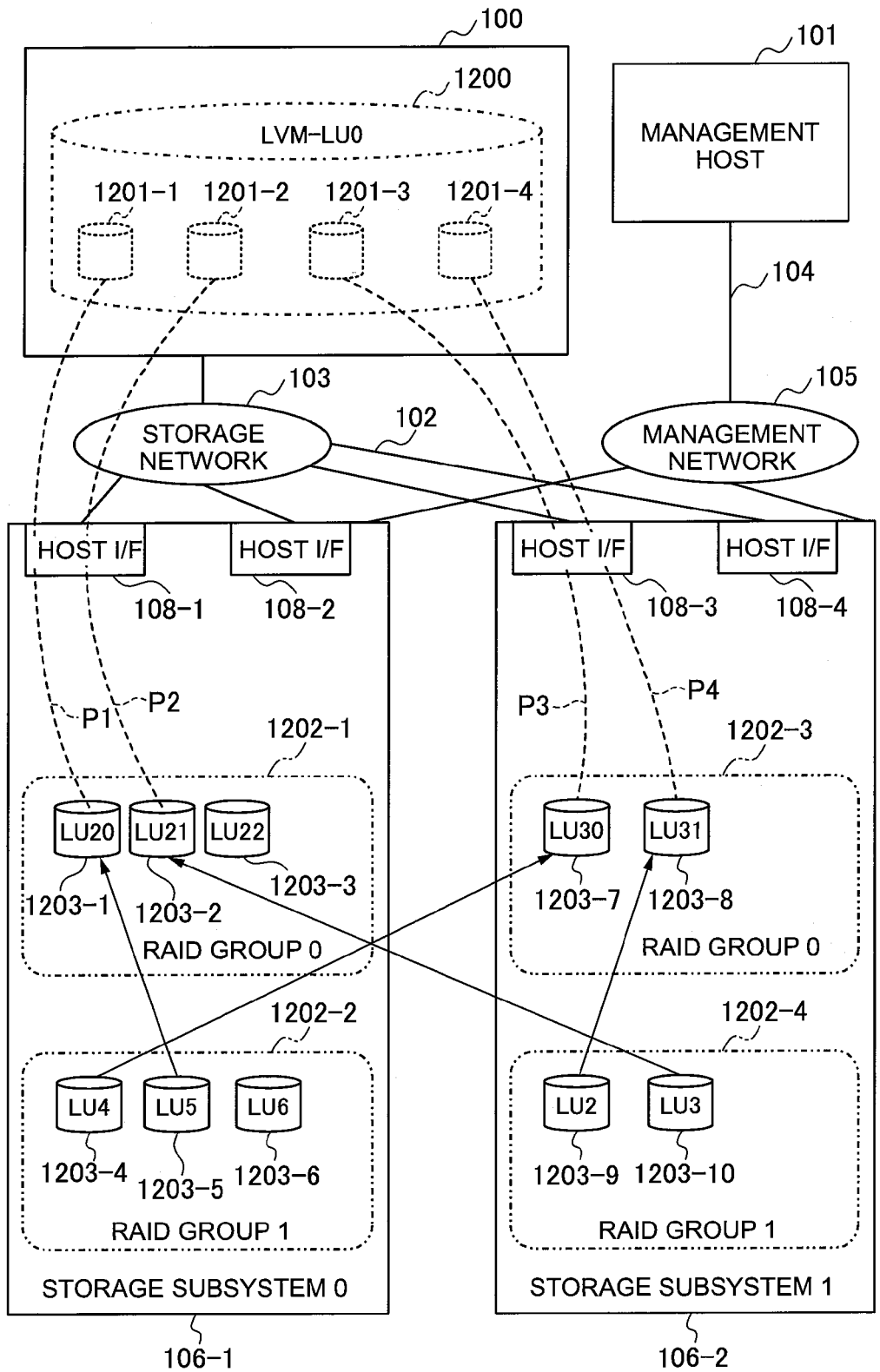
FIG. 24 is a diagram showing a configuration example of the computer system and an example of the load distribution processing in the second embodiment of this invention.

FIG. 24 is a diagram showing a configuration example of the computer system and an example of the load distribution processing in the second embodiment of this invention.

The computer system in the second embodiment includes a storage subsystem 106-1 and a storage subsystem 106-2.

The storage subsystem 106-1 includes a host I/F 108-1 and a host I/F 108-2, and communicates with the host 100 from the host I/F 108-1 and the host I/F 108-2 via the storage network 103.

The storage subsystem 106-1 includes a RAID group 0 (1202-1) and a RAID group 1 (1202-2) respectively configured of multiple disks 115.

In the RAID group 0 (1202-1), an internal LU 1203-1, an internal LU 1203-2, and an internal LU 1203-3 are created. In the RAID group 1 (1202-2), an internal LU 1203-4, an internal LU 1203-5, and an internal LU 1203-6 are created.

An internal LUN 301 is allocated to each of the internal LUs 1203. More specifically, an internal LUN 301 "LU20" is allocated to the internal LU 1203-1, an internal LUN 301 "LU21" is allocated to the internal LU 1203-2, an internal LUN 301 "LU22" is allocated to the internal LU 1203-3, an internal LUN 301 "LU4" is allocated to the internal LU 1203-4, an internal LUN 301 "LU5" is allocated to the internal LU 1203-5, and an internal LUN 301 "LU6" is allocated to the internal LU 1203-6.

The storage subsystem 106-2 includes a host I/F 108-3 and a host I/F 108-4, and communicates with the host 100 from the host I/F 108-3 and the host I/F 108-4 via the storage network 103.

The storage subsystem 106-1 includes a RAID group 0 (1202-3) and a RAID group 1 (1202-4) respectively configured of multiple disks 115.

In the RAID group 0 (1202-3), an internal LU 1203-7 and an internal LU 1203-8 are created. In the RAID group 1 (1202-4), an internal LU 1203-9 and an internal LU 1203-10 are created.

In the storage subsystem 106-2, similarly, an internal LUN 301 is allocated to each of the internal LUs 1203. More specifically, an internal LUN 301 "LU30" is allocated to the internal LU 1203-7, an internal LUN 301 "LU31" is allocated to the internal LU 1203-8, an internal LUN 301 "LU2" is allocated to the internal LU 1203-9, and an internal LUN 301 "LU3" is allocated to the internal LU 1203-10.

The host 100 includes an LVM-LU 1200. The LVM-LU 1200 comprises a C-LU 1201-1, a C-LU 1201-2, a C-LU 1201-3, and a C-LU 1201-4. The correspondence of the C-LUs 1201 with the internal LUs 1203 is specified.

More specifically, the target of the C-LU 1201-1 is an internal LU 1203-1, the target of the C-LU 1201-2 is an internal LU 1203-2, the target of the C-LU 1201-3 is an internal LU 1203-7, and the target of the C-LU 1201-4 is an internal LU 1203-8.

That is, between the access source C-LUs 1201 specified by the host 100 (C-LU 1201-1 to C-LU 1201-4) and the access target internal LUs 1203 specified by the access request from the host 100 (internal LU 1203-1, internal LU 1203-2, internal LU 1203-7, internal LU 1203-8), the paths P1 to P4 are created with the host I/Fs 108-1 and the host I/F 108-3 as the relay units.

In each of the storage subsystems 106-1 and 106-2 at this time, it is specified to continuously measure the bandwidth of the host I/Fs 108-1 and 108-2 and the host I/Fs 108-3 and 108-4 as load information, store the measured load information at the time of backup, and at the time of restoration, distribute the load of the host I/Fs 108-1 and 108-2 and the host I/Fs 108-3 and 108-4 with reference to the stored load information.

For example, if the paths P1 to P4 are set unevenly between the host I/Fs 108-1 and 108-2 and the host I/Fs 108-3 and 108-4, the paths P1 to P4 are, as shown in FIG. 24, set evenly for the host I/F 108-1 and the host I/F 108-3.

By this method, in each of the storage subsystems 106-1 and 106-2, the bandwidth used by the host I/F 108-1 and the host I/F 108-3 can be evenly distributed.

Figure 25:
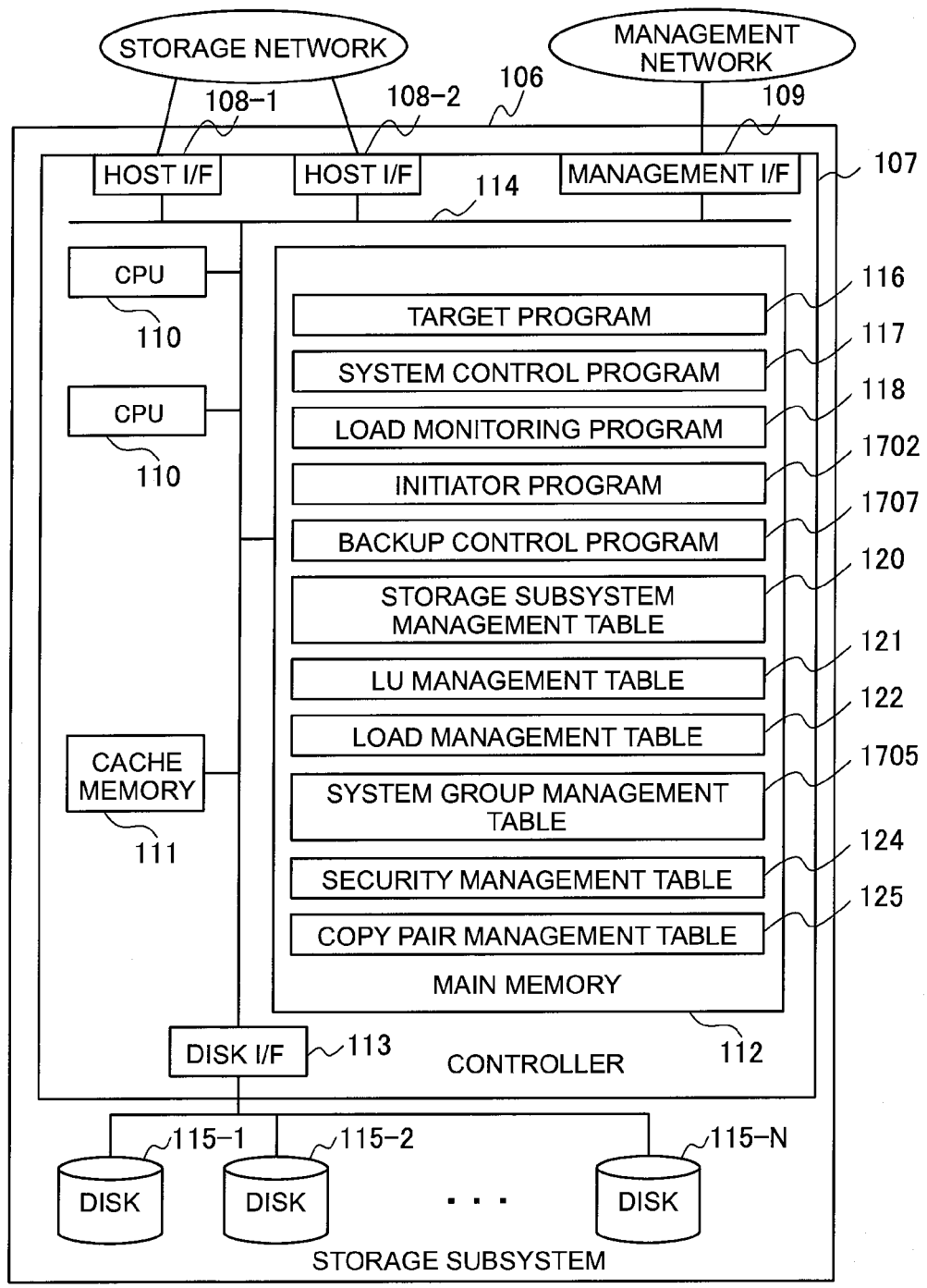
FIG. 25 is a block diagram showing a configuration example of the storage subsystem in the second embodiment of this invention.

FIG. 25 is a block diagram showing a configuration example of the storage subsystem 106 in the second embodiment of this invention.

The storage subsystem 106-1 and the storage subsystem 106-2 have the same configuration, and each storage subsystem 106 is the same as the first embodiment except that the main memory 112 includes the initiator program 1702 and the system group management table 1705, and therefore, the description of those components is omitted.

The initiator program 1702 is the program for exchanging data with the iSCSI target of the other storage subsystems 106 using the iSCSI protocol. The initiator program 1702 is used for transferring the data of the internal LU 1203 to another storage subsystem 106.

The system group management table 1705 is a table for managing the information required for the communication with the other storage subsystems 106.

FIG. 26 is a diagram showing an example of the copy pair management table in the second embodiment of this invention. More specifically, FIG. 26 shows the copy pair management table 125 of the storage subsystem 106-1.

FIG. 27 is also a diagram showing an example of the copy pair management table in the second embodiment of this invention. More specifically, FIG. 27 shows the copy pair management table 125 of the storage subsystem 106-2.

If a copy pair is created of the storage subsystems 106, different storage subsystem IDs are stored in the storage subsystem IDs 3104 of FIGS. 26 and 27.

Figure 28:
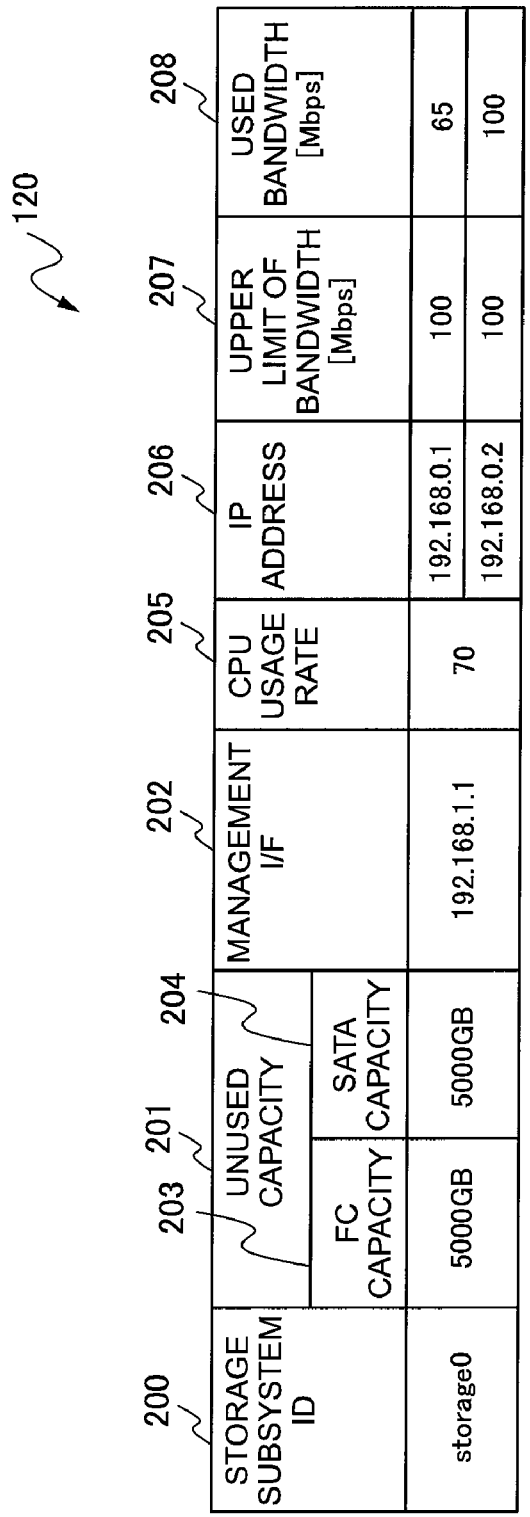
FIG. 28 is a diagram showing an example of the storage subsystem management table in the second embodiment of this invention.

FIG. 28 is a diagram showing an example of the storage subsystem management table in the second embodiment of this invention. More specifically, FIG. 28 shows the storage subsystem management table 120 of the storage subsystem 106-1.

Figure 29:
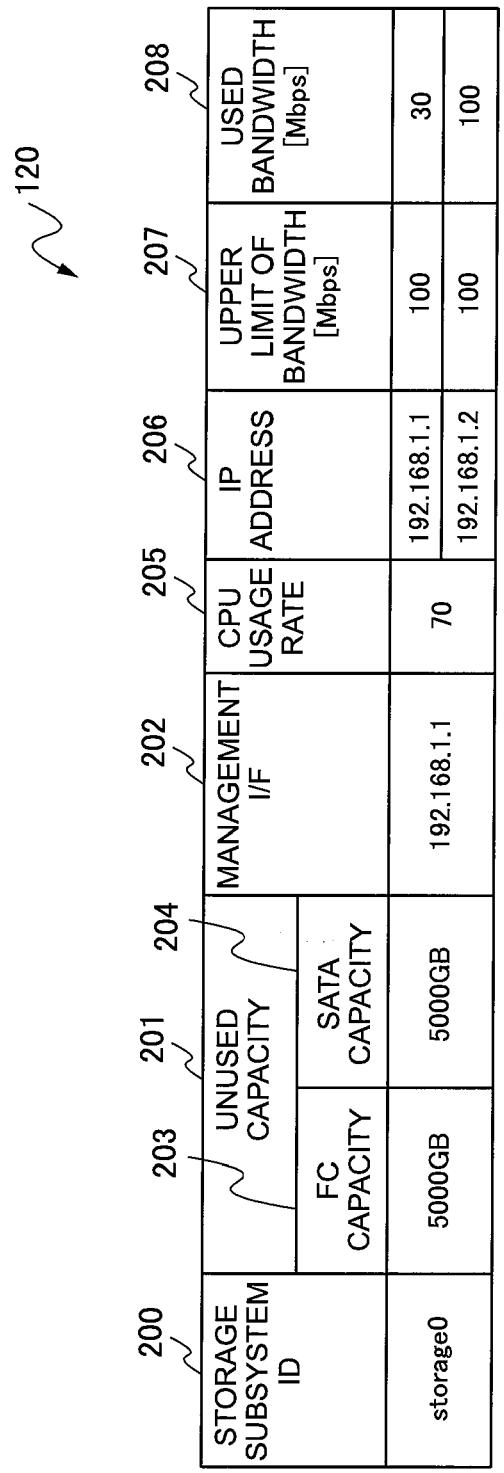
FIG. 29 is a diagram showing an example of the storage subsystem management table in the second embodiment of this invention.

FIG. 29 is also a diagram showing an example of the storage subsystem management table in the second embodiment of this invention. More specifically, FIG. 29 shows the storage subsystem management table 120 of the storage subsystem 106-2.

Figure 30:
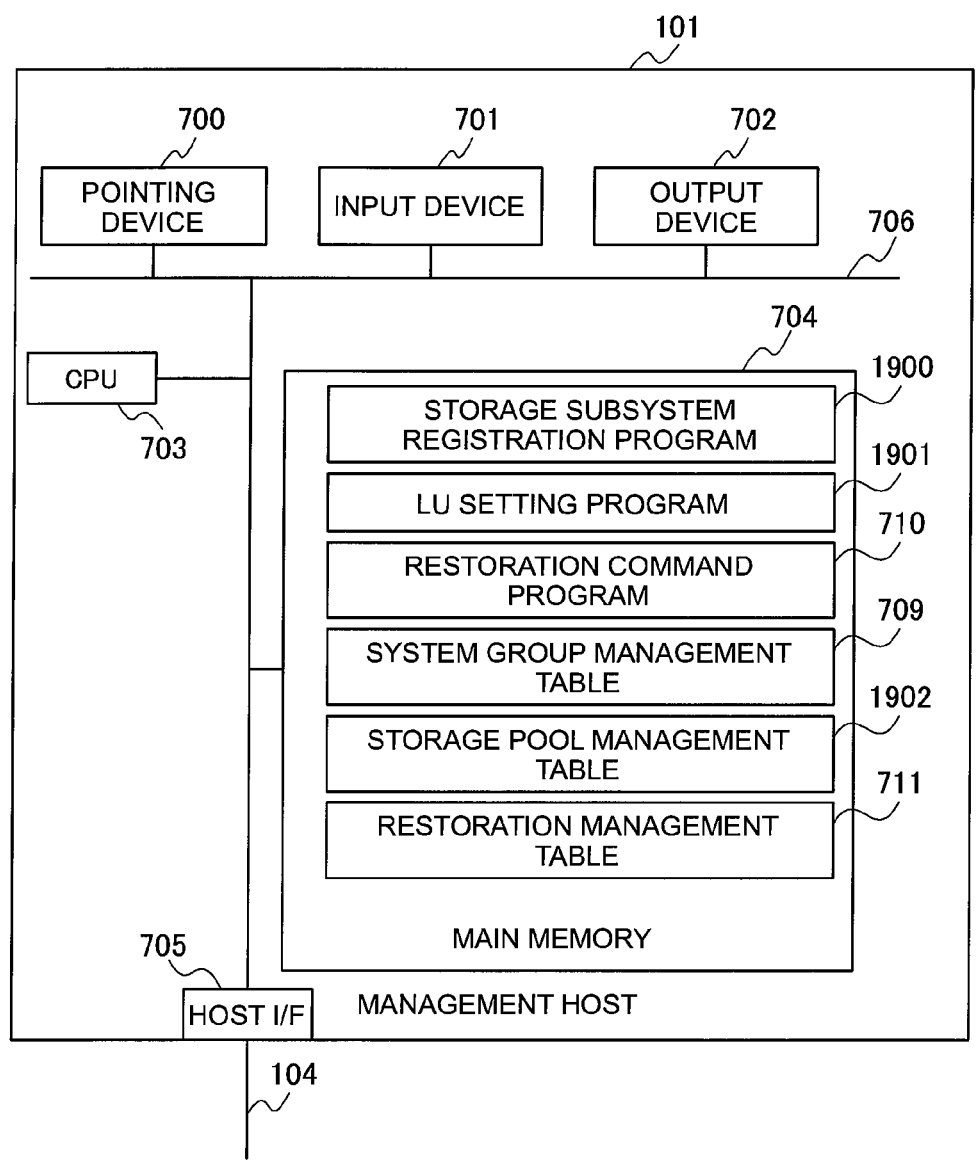
FIG. 30 is a block diagram showing a configuration example of the management host in the second embodiment of this invention.

FIG. 30 is a block diagram showing the configuration example of the management host 101 in the second embodiment of this invention.

The main memory 704 stores a restoration command program 710, a system management table 709, a restoration management table 711, a storage subsystem registration program 1900, an LU setting program 1901, a system group management table 709, and a storage pool management table 1902.

The storage subsystem registration program 1900 is the program for sending the information of the system group management table 709 to the storage subsystem 106 registered in the system group management table 709 when a storage subsystem 106 is newly registered.

The LU setting program 1901 is a program for the administrator to allocate the required storage area to the C-LUs 1201 configuring an LVM-LU 1200 from the storage pool and to set the relevant allocated storage area to the storage subsystem 106.

The storage pool management table 1902 manages the unused capacity 201 for the system group to share the unused capacity 201 of the storage subsystems 106 registered in the system group management table 709. The above-mentioned storage pool is a storage area configured of all the unused areas in multiple storage subsystems 106.

FIG. 31 is a diagram showing an example of the system group management table 709 in the second embodiment of this invention.

In the example of FIG. 31, the "storage0" whose management I/F 202 is "192.168.1.1" and the "storage 1" whose management I/F 202 is "192.168. 1.2" are registered in the same system group "system0."

FIG. 32 is a diagram showing an example of the storage pool management table 1902 in the second embodiment of this invention.

The storage pool management table 1902 includes a storage pool ID 2100, a storage subsystem ID 200, and an unused capacity 201.

The storage pool ID 2100 is the identifier for uniquely identifying storage pools in the system group. In the example shown in FIG. 32, the storage pool ID 2100 is allocated to each storage subsystem 106, while it can be allocated to each RAID group 1202 of the storage subsystems 106 or to each disk 115.

The storage pool ID 2100 is used when creating LUs for LVM. The unused capacity 201 of the storage pool is the capacity used as a C-LU 1200 when creating LUs for LVM. Therefore, the LVM-LU 1201 may be created using the unused storage area of the storage subsystems 106.

The processing of creating an LVM-LU 1200 is described below. The LVM-LU 1200 creation processing is, as in the first embodiment of this invention, started with the setting using the LU creation screen for LVM 2300.

Figure 33:
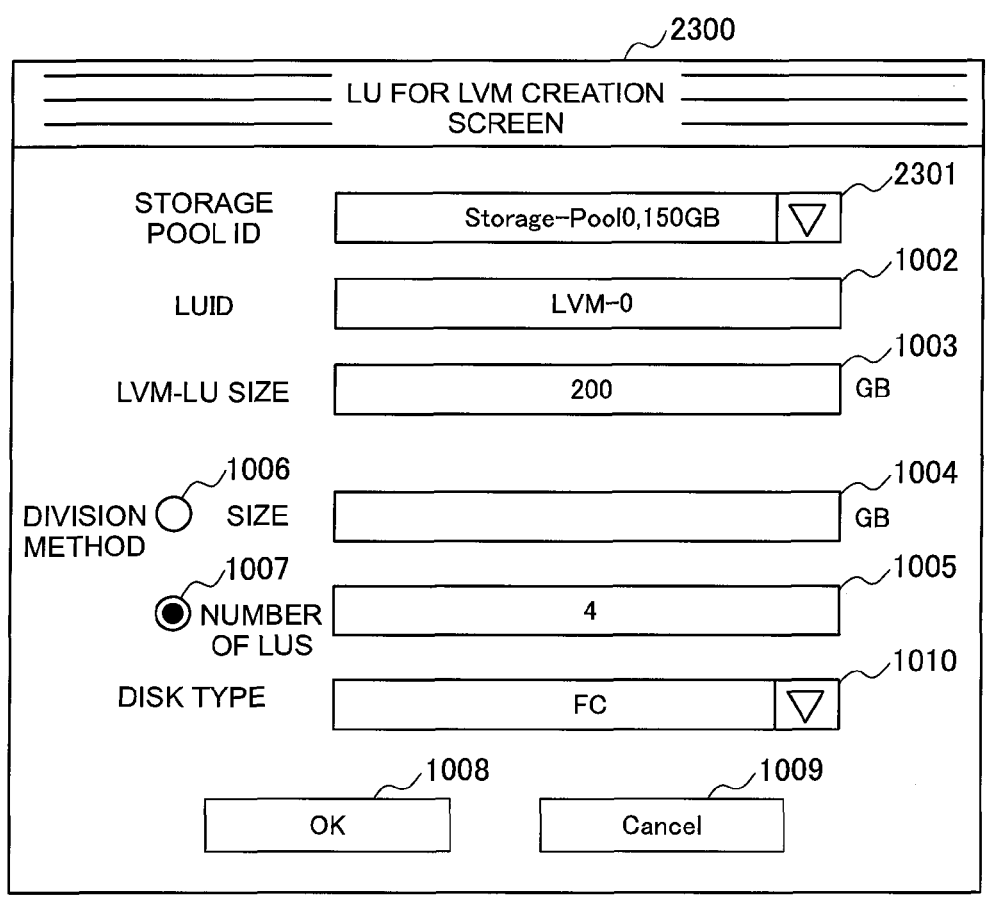
FIG. 33 is a diagram showing an example of the LU creation screen for LVM in the second embodiment of this invention.

FIG. 33 is a diagram showing an example of the LU creation screen for LVM 2300 in the second embodiment of this invention.

The LU creation screen for LVM 2300 comprises a storage pool ID 2301, an LU ID 1002, an LVM-LU size 1003, a division method (size 1006) with the input area 1004, a division method (number of LUs 1007) with the input area 1005, a disk type 1010, an OK button 1008, and a cancel button 1009.

The storage pool ID 2301 is the pull-down menu which refers to the storage pool management table 1902 and displays the registered storage pool IDs 2100 and the unused capacity 201 as alternatives.

Figure 34:
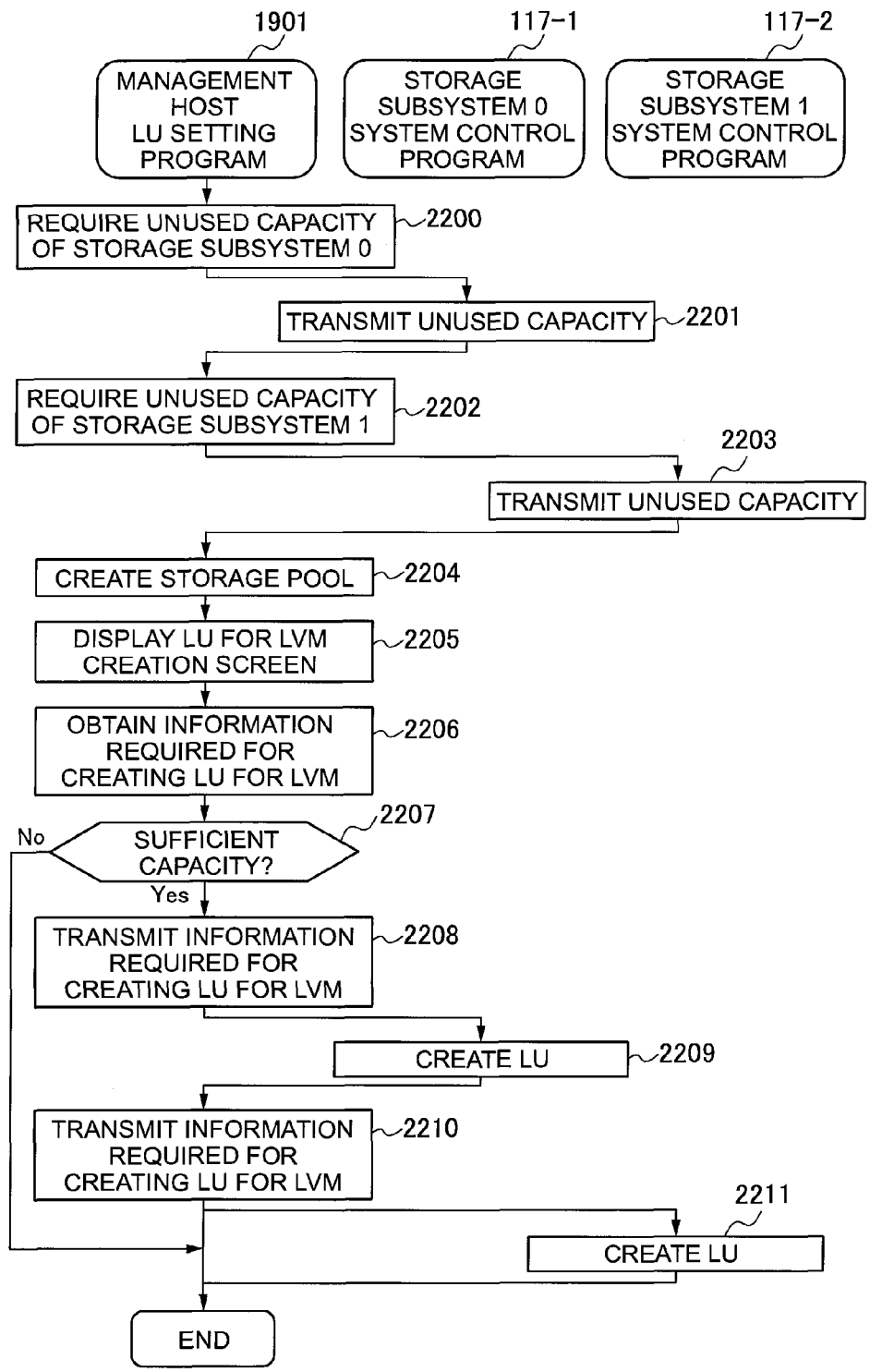
FIG. 34 is a flowchart showing the processing of creating an LVM-LU in the second embodiment of this invention.

FIG. 34 is a flowchart showing the processing of creating an LVM-LU 1200 in the second embodiment of this invention.

The LU setting program 1901 of the management host 101 performs the following processing when started up by the administrator.

The LU setting program 1901 obtains the unused capacity 201 from the storage subsystems 106 registered in the system group management table 709, and updates the contents of the storage pool management table 1902 to the latest status.

In the example shown in FIG. 34, firstly, the LU setting program 1901 sends the request (2200) for obtaining the unused capacity 201 to the system control program 117 of the storage subsystem 0 (117-1). Hereinafter, for distinguishing the programs and tables included in the storage subsystems 106, "-1" is added to the names of those in the storage subsystem 106-1 and "-2" to those in the storage subsystem 106-2.

The system control program 117-1, when receiving the request for obtaining the unused capacity 201, refers to the storage subsystem management table 120-1, and sends the unused capacity 201-1 to the LU setting program 1901 (2201).

The LU setting program 1901 updates the unused capacity 201 of the entry corresponding with the storage subsystem 106-1 of the storage pool management table 1902 to the obtained unused capacity 201-1. The program also sends the request for obtaining the unused capacity 201-2 to the system control program 117-2 (2202).

The system control program 117-2, when receiving the request for obtaining the unused capacity 201, refers to the storage subsystem management table 120-2, and sends the unused capacity 201-2 to the LU setting program 1901 (2203).

The LU setting program 1901 updates the unused capacity 201 of the entry corresponding with the storage subsystem 106-2 of the storage pool management table 1902 to the obtained unused capacity 201-2. By the above-mentioned processing, the latest storage pool management table 1902 is created (2204).

The LU setting program 1901 displays the LU creation screen for LVM 2300 on the output device 702 (2205).

The administrator selects the storage pool ID 2100 for creating a C-LU 1201, and inputs the LU ID 1002 and the LVM-LU size 1003. Next, the administrator selects the method of dividing the LVM-LU 1200 into C-LUs 1201, and inputs the information required for the division method. The administrator confirms the input information, and clicks the OK button 1008. By the above-mentioned processing, the LU setting program 1901 obtains the information required for creating an LVM-LU 1200 (2206).

The LU setting program 1901 determines whether the internal LU 1203 of the input LU size 1003 can be created of the selected storage pool or not (2207).

If the input LU 1203 of the input LU size 1003 is determined to be impossible to create of the selected storage pool, the LU setting program 1901 reports the error message displayed on the output device that the capacity is insufficient to the administrator, and completes the processing.

If the input LU 1203 of the input LVM-LU size 1003 is determined to be possible to create of the selected storage pool, the LU setting program 1901 sends the LU ID 306 and the number and the size of LUs to be created, included in the request for creating the LUs to the system control program 117-1 (2208).

The system control program 117-1 creates the internal LU 1203 of the specified size in the RAID group 1202 including the unused area, and registers it in the LU management table 121-1. The system control program 117-1 also sends the LU creation report that the LU creation is completed to the LU setting program 1901 (2209).

The LU setting program 708, when receiving the LU creation response from the system control program 117-1, sends the LU IDs 306, the number and the size of LUs to be created, which are required for creating the internal LU 1203, included in the LU creation request, to the system control program 117-2.

The system control program 117-2 creates the LU 1203 of the specified size in the RAID group 1202 including the unused area, and registers it in the LU management table 121-2. The system control program 117-2 also sends the LU creation response that the LU creation is completed to the LU setting program 1901. By the above-mentioned processing, the internal LU 1203 configuring the LVM-LU 1200 can be created.

It may be permitted to enable the attributes such as high performance, archive, or low performance to be set for creating the C-LU 1201 configuring the LVM-LU 1200 of the appropriate storage pool depending on the purpose of the LVM-LU 1200. It may also be permitted to enable multiple storage subsystems 106 to be specified for creating the C-LU 1201 configuring the LVM-LU 1200.

The example shown in FIG. 33 intends to make the LVM program 508 of the host 100 create the LVM-LU 1200 whose capacity is 200 GB and whose LU ID 306 is "LVM-0."

As shown in FIG. 24, the LVM-LU 1200 created by the relevant settings comprises two internal LUs 1203 whose LU size is 50 GB each in the storage subsystem 106-1 whose storage subsystem ID 200 is "storage 0," and two internal LUs 1203 whose LU size is 50 GB in the storage subsystem 106-2 whose storage subsystem ID 200 is "storage 1."

Note that the LVM-LU 1200 creation processing is the same as the LVM-LU 1200 creation processing in the first embodiment of this invention (refer to FIG. 15), except for the following items. That is, by the discovery of step 1100, the initiator program 509 obtains the target information of both of the target programs 116-1 and 116-2. Furthermore, the LVM-LU 1200 creation processing here is different in that, if the selected iSCSI targets exist both in the storage subsystems 106-1 and 106-2.

It is also possible to create an LVM-LU 1200 without troubling the administrator if the host 100 includes a management I/F and communicates with the management host 101, and if the host 100, the management host 101, and the storage subsystems 106 collaborate with each other.

The LU setting program 1901, after receiving the creation completion response of the internal LUs 1203 from the storage subsystems 106, sends the LU IDs 306 to the initiator program, and logs in to the iSCSI targets configuring the LVM-LU 1200. After the login is completed, the LU setting program 1901 sends the LU IDs 306 to the LVM program 508, and creates the LVM-LU 1200 of the iSCSI targets to which the target names including the same LU IDs 306 are allocated.

By the above-mentioned processing, the administrator can automatically create the LVM-LUs 1200 only by inputting the required information on the LU creation screen for LVM 2300.

Figure 35A:
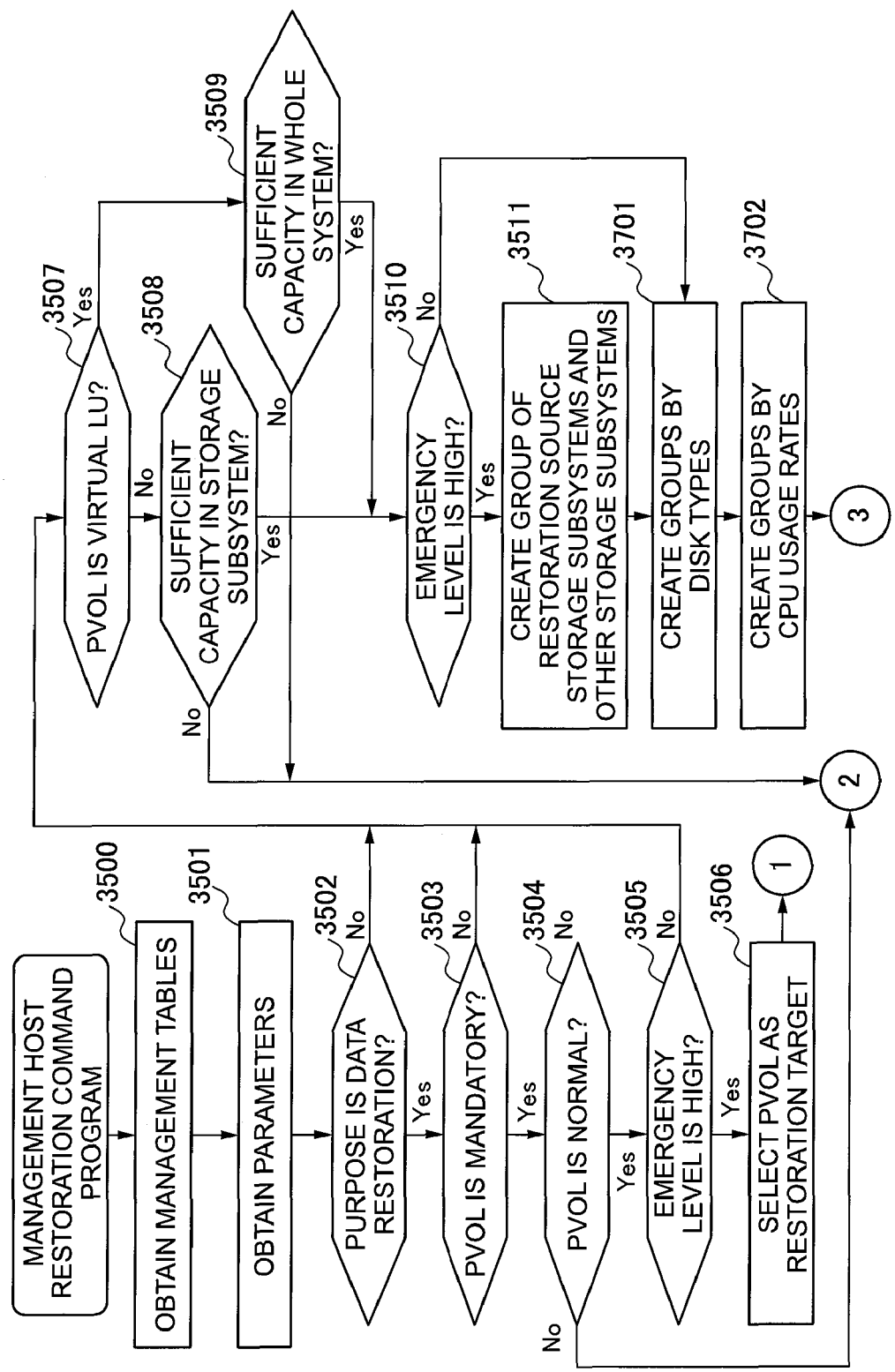
FIG. 35A is a flowchart showing the restoration processing in the second embodiment of this invention.
Figure 35B:
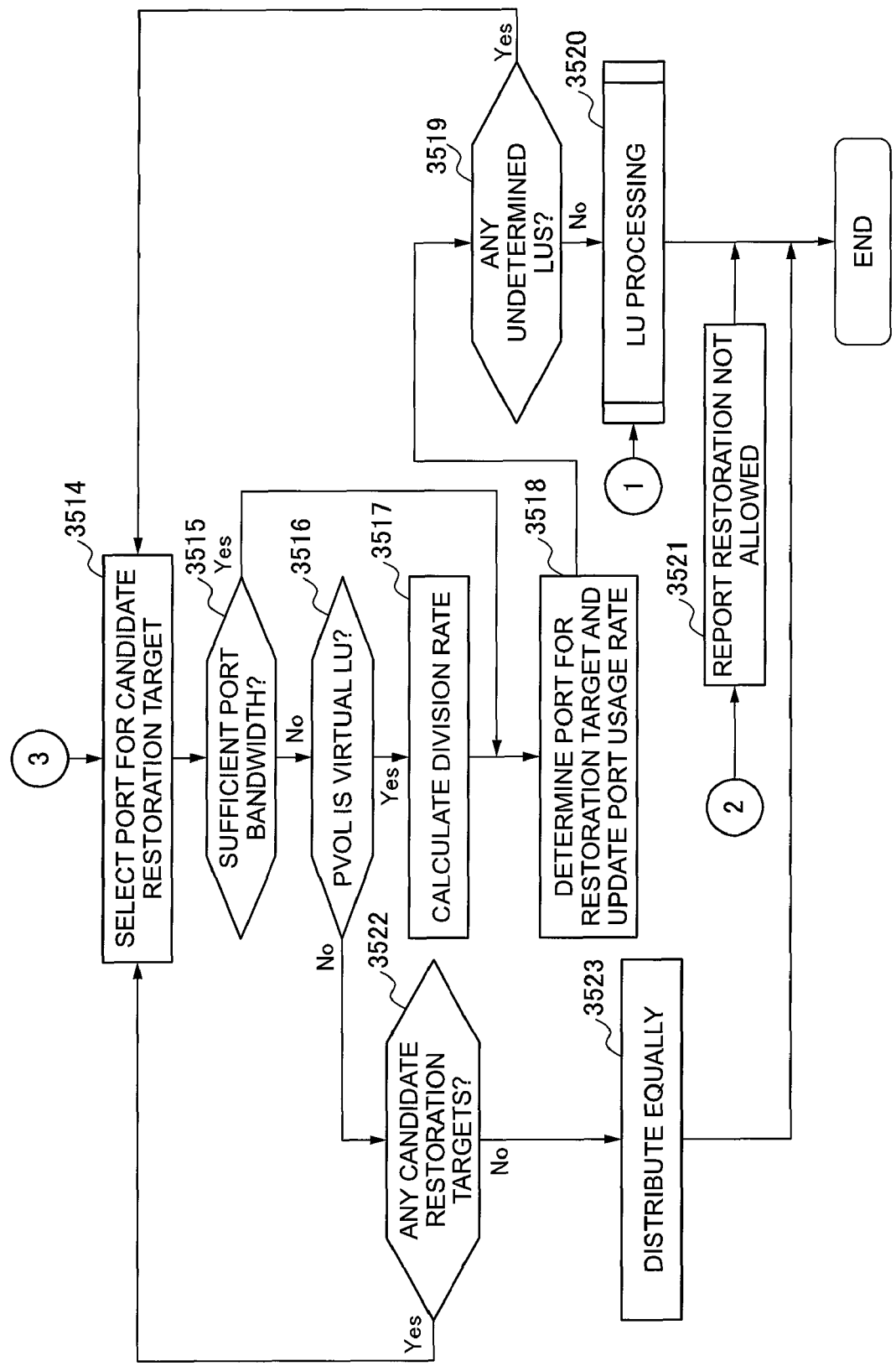
FIG. 35B is a flowchart showing the restoration processing in the second embodiment of this invention.

FIGS. 35A and 35B are a series of flowcharts showing the restoration processing in the second embodiment of this invention. The steps different from the first embodiment are described below.

The restoration command program 710 determines whether the purpose of the restoration is data restoration or not (3502).

If data restoration is determined to be the purpose, the restoration command program 710 performs the processing of step 3503.

If data restoration is determined not to be the purpose, the restoration command program 710 performs the processing of step 3507.

The restoration command program 710 refers to the backup type of the obtained copy pair management table 125, and determines whether the PVOL is required or not (3503).

If the backup type is "full" and the PVOL is determined not to be required, the restoration command program 710 performs the processing of step 3507.

If the backup type is other than "full" and the PVOL is determined to be required, the restoration command program 710 performs the processing of step 3504.

The restoration command program 710 determines whether the obtained emergency level is high or low (3505).

If the emergency level is determined to be high, the restoration command program 710 performs the processing of step 3506.

If the emergency level is determined not to be high, the restoration command program 710 performs the processing of step 3507.

The restoration command program 710 refers to the LU IDs of the LU management table, and determines whether the PVOL is a virtual LU or not (3507).

If the PVOL is determined to be a virtual LU, the restoration command program 710 performs the processing of step 3509.

If the PVOL is determined not to be a virtual LU, the restoration command program 710 performs the processing of step 3508.

If the restoration command program 710 determines whether the unused capacity of the storage subsystems 106 is determined to be sufficient for the size of the PVOL (3508).

If the unused capacity of the storage subsystem 106 is determined to be sufficient for the size of the PVOL, the restoration command program 710 limits the storage subsystems 106 as the restoration destinations to the storage subsystems 106 with the sufficient unused capacity, and performs the processing of step 3510.

If the unused capacity of the storage subsystem 106 is determined to be insufficient for the size of the PVOL, the restoration command program 710 performs the processing of step 3521.

The restoration command program 710 determines whether the storage pool has the sufficient capacity for the size of the PVOL (3509).

If the storage pool is determined to have the sufficient capacity for the size of the PVOL, the restoration command program 710 performs the processing of step 3510.

If the storage pool is determined not to have the sufficient capacity for the size of the PVOL, the restoration command program 710 performs the processing of step 3521.

The restoration command program 710 determines whether the obtained emergency level is high or not (3510).

If the emergency level is determined to be high, the restoration command program 710 performs the processing of step 3511.

If the emergency level is determined not to be high, the restoration command program 710 performs the processing of step 3512.

The restoration command program 710 refers to the obtained storage subsystem ID 3104, and creates a group of the storage subsystems 106 as the restoration sources and a group of the storage subsystems 106 as another candidate restoration destinations. As for the restoration candidate, the processing is performed assuming the group of the storage subsystems 106 as the restoration sources has higher priority (3511).

Among the groups created at step 3511, the restoration command program 710 creates a group of the storage subsystems with the unused capacity sufficient for the size of the PVOL in the same disk type as the PVOL and another group of the storage subsystems without such capacity. As for the restoration candidate, the processing is performed assuming the group of the storage subsystems 106 with the sufficient unused capacity in the same disk type has higher priority (3701).

The restoration command program 710, referring to the CPU usage rate 205 of the obtained storage subsystem management table 120, among the groups created at step 3512, creates a group of the storage subsystems whose CPU usage rate exceeds the threshold and another group of the storage subsystems whose CPU usage rate 205 does not exceed the threshold. For example, the threshold is specified to be 70%. Though not shown in the drawings, for example, the threshold is stored in the main memory 704 of the management host 101 in advance. The administrator can change the threshold using the restoration command program 710. As for the restoration candidate, the processing is performed assuming the group not exceeding the threshold has higher priority (3702). If multiple CPUs exist in a storage subsystem, the average value is applied.

The restoration command program 710, from the group of the storage subsystems 106 with the highest priority remaining as the candidate restoration destination, selects the host I/F 108 with the lowest port usage rate as the target port. Next, from among the restoration source LUs whose restoration destination ports are not determined, the LU with the largest host I/F bandwidth 3108 is selected as the target LU (3514).

The steps 3515 and later are the same as the processing of the first embodiment. If the internal LU4 and the LU5 in the storage subsystem 106-1 as the backup (SVOL) of the LVM-LU 1200 in FIG. 24 and the internal LU2 and the LU3 are restored on condition that the purpose is "test," the emergency is "low," and the initiator name is "host1," the host I/F used by the restoration destination LUs of the LU5 of the storage subsystem 106-1 and the LU3 of the storage subsystem 106-2 is the host I/F 108-1 in FIG. 24, and the host I/F used by the restoration destination LUs of the LU4 of the storage subsystem 106-1 and the LU2 of the storage subsystem 106-2 is the host I/F 108-3.

Figure 36:
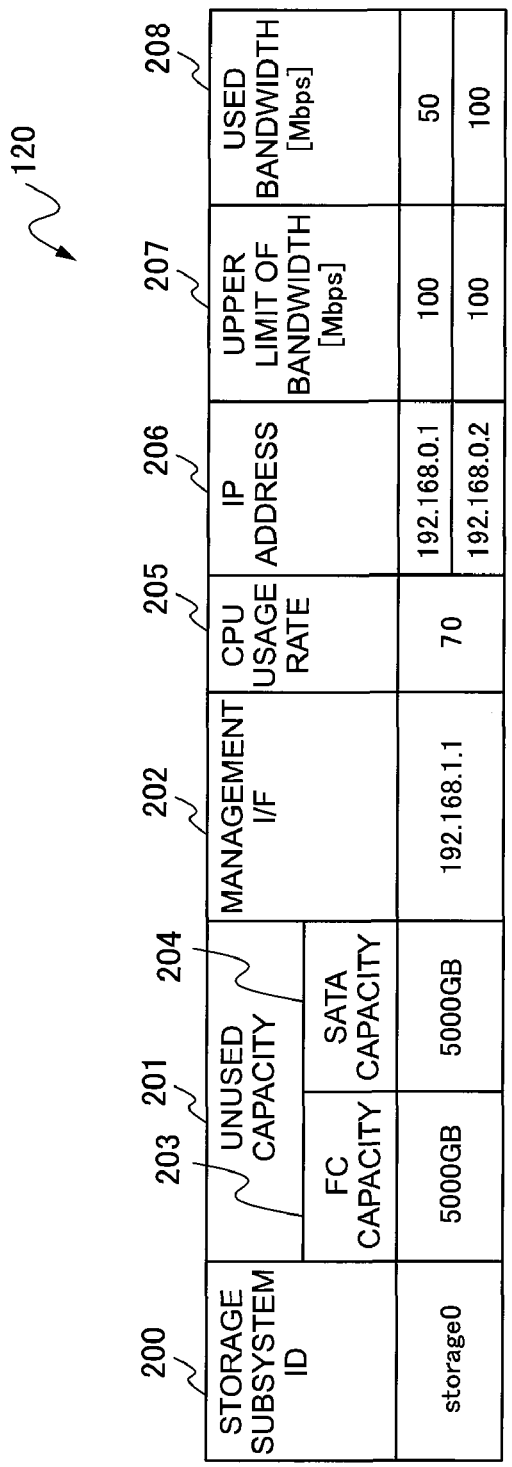
FIG. 36 is a diagram showing an example of the storage subsystem management table after restoration in the second embodiment of this invention.

FIG. 36 is a diagram showing an example of the storage subsystem management table 120 after the restoration of the storage subsystems 106-1 in the second embodiment of this invention.

Figure 37:
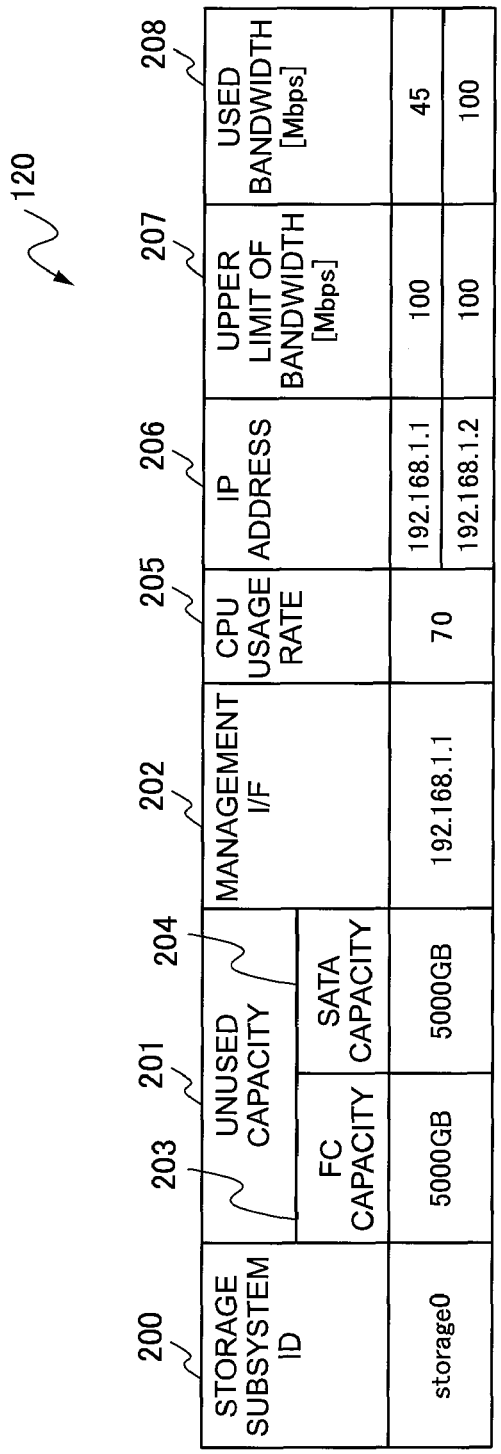
FIG. 37 is a diagram showing an example of the storage subsystem management table after restoration in the second embodiment of this invention.

FIG. 37 is a diagram showing an example of the storage subsystem management table 120 after the restoration of the storage subsystems 106-2 in the second embodiment of this invention.

The bandwidth used by the host I/F 108 in FIG. 36 whose IP address is 192.168.0.1 and the bandwidth used by the host I/F 108 in FIG. 37 whose IP address is 192.168.1.1 are distributed by the restoration processing.

FIG. 38 is a diagram showing an example of the copy pair management table 125 after the restoration of the storage subsystems 106-1 in the second embodiment of this invention.

FIG. 39 is a diagram showing an example of the copy pair management table 125 after the restoration of the storage subsystems 106-2 in the second embodiment of this invention.

In FIGS. 38 and 39, as in the first embodiment, if the restoration destination is not the PVOL, the restoration destination corresponding with the internal LUN 3105 is updated as the PVOL.

The LU management table 121 registers the LUs created by the restoration processing as in the first embodiment.

The second embodiment of this invention, by increasing the number of the C-LUs 1201 configuring the LVM-LU 1200, can reduce the size of the internal LU 1203 and the amount of the transfer data, which can reduce the time for data transfer.

As mentioned above, the second embodiment of this invention can distribute the load on the host I/F 108 of the specific storage subsystems 106 in the computer system connected with multiple storage subsystems 106 at the time of restoration in units of LUs which are the access targets of the application program 507 or in units of internal LUs 1203 whose storage area is smaller than the LVM-LU 1200. This method can provide for the highly scalable computer system by which the bandwidth of the host I/F 108 can be efficiently utilized.

Furthermore, though the second embodiment of this invention has described the example in which data is transferred via the storage network 103, data transfer between the storage subsystems 106-1 and 106-2 may also be performed via another data transfer network by connecting the storage subsystems 106-1 and 106-2 by a different data transfer network from the storage network 103 or the management network 105. In this case, as the bandwidth used by the storage network 103 can be reduced, the I/O performance deterioration of the host 100 due to the data transfer can be prevented.

EXPLANATION OF REFERENCE NUMERALS

100: Host
101: Management host
103: Storage network
105: Management network
106: Storage subsystem
107: Controller
108: Host I/F
109: Management I/F
110: CPU
111: Cache memory
112: Main memory
113: Disk I/F
114: Bus
115: Disk
1200: LVM-LU
1203: Internal LU

The invention claimed is:

1. A storage subsystem, comprising:

plurality of memory devices for storing data; and a controller for sending and receiving information to and from a host via a network, and controlling input and output of the data into and from the memory device with the memory device as a backup destination or a restoration destination of the data;

wherein the controller measures, at a time of communicating with the host, load information of a plurality of host interface units that send and receive information to and from the host via a network;

stores, at a time of backing up the data, the load information that is measured at the time of the backup; and distributes, at a time of restoring the backup data, the load of each of the host interface units based on the load information that is stored at the time of the backup, wherein the controller measures a used bandwidth of each of the host interface units as load information of each of the host interface units;

stores, at the time of the backup, the used bandwidth of each of the host interface units that is measured at the time of the backup as the load information; and at the time of the restoration, decides a restoration destination according to an objective of restoration from the memory device, restores the backup data to the decided restoration destination, and distributes the load of a host interface unit corresponding to the decided restoration destination among each of the host interface units based on the stored used bandwidth of each of the host interface units.

2. A data processing method of a storage subsystem comprising a plurality of memory devices for storing data, and a controller for sending and receiving information to and from a host via a network, and controlling input and output of the data into and from the memory device with the memory device as a backup destination or a restoration destination of the data, wherein the controller executes:

a first step of measuring, at a time of communicating with the host, load information of a plurality of host interface units that send and receive information to and from the host via a network;

a second step of storing, at a time of backing up the data, the load information that is measured at the time of the backup; and a third step of distributing, at a time of restoring the backup data, the load of each of the host interface units based on the load information that is stored at the time of the backup, wherein the controller executes processing of measuring a used bandwidth of each of the host interface units as load information of each of the host interface units at the first step;

storing the used bandwidth of each of the host interface units that is measured at the time of the backup as the load information at the second step; and deciding a restoration destination according to an objective of restoration from the memory device, restoring the backup data to the decided restoration destination, and distributing the load of a host interface unit corresponding to the decided restoration destination among each of the host interface units based on the stored used bandwidth of each of the host interface units at the third step.

3. The data processing method of a storage subsystem according to claim 2, wherein, at the third step, the controller executes processing upon distributing the load of each of the host interface units according to load information that is stored at the time of the backup and load information that is measured at the time of the restoration.

4. The data processing method of a storage subsystem according to claim 2, wherein the controller executes processing of measuring a used bandwidth of each of the host interface units as load information of each of the host interface units at the first step;

storing the used bandwidth of each of the host interface units that is measured at the time of the backup as the load information at the second step; and distributing the load of each of the host interface units based on the stored used bandwidth of each of the host interface units at the third step.

5. The data processing method of a storage subsystem according to claim 2, wherein the controller executes:

a fourth step of managing a storage area of the memory device as a plurality of logical volumes; and wherein the controller executes processing of measuring a used bandwidth of each of the host interface units as load information of each of the host interface units at the first step;

storing the used bandwidth of each of the host interface units that is measured at the time of the backup as the load information at the second step; and selecting a logical volume of an access destination that is designated in an access request from the host as a restoration destination based on the stored used bandwidth of each of the host interface units, and, if the used bandwidth of the host interface unit corresponding to the selected logical volume exceeds a setting value, partitioning the selected logical volume into a plurality of logical volumes, deciding the partitioned logical volumes as a new restoration destination, and distributing and allocating each of the host interface units to each of the logical volumes of the decided new restoration destination.

6. A computer system, comprising:

a plurality of storage subsystems including a host for issuing a command, a plurality of memory devices for storing data, and a controller for sending and receiving information to and from the host via a network, and controlling input and output of the data into and from the memory device with the memory device as a backup destination or a restoration destination of the data;

wherein the controller of each of the storage subsystems measures, at a time of communicating with the host, load information of a plurality of host interface units that send and receive information to and from the host via a network;

stores, at a time of backing up the data, the load information that is measured at the time of the backup; and distributes, at a time of restoring the backup data, the load of each of the host interface units based on the load information that is stored at the time of the backup, wherein the controller of each of the storage subsystems measures a used bandwidth of each of the host interface units as load information of each of the host interface units;

stores, at the time of the backup, the used bandwidth of each of the host interface units that is measured at the time of the backup as the load information; and at the time of the restoration, decides a restoration destination according to an objective of restoration from the memory device, restores the backup data to the decided restoration destination, and distributes the load of a host interface unit corresponding to the decided restoration destination among each of the host interface units based on the stored used bandwidth of each of the host interface units.

7. The computer system according to claim 6, wherein the controller of each of the storage subsystems manages a storage area of the memory device as a plurality of logical units, and manages each of the host interface units as a relay unit of a path connecting a logical unit of an access destination that is designated in an access request from the host and a logical unit of an access source that is prescribed in the host;

measures a used bandwidth of each of the host interface units as load information of each of the host interface units;

stores, at the time of the backup, the used bandwidth of each of the host interface units that is measured at the time of the backup as the load information;

at the time of the restoration, decides a logical unit group of a restoration destination based on the stored used bandwidth of each of the host interface units and the used bandwidth of each of the host interface units that is measured at the time of the restoration, restores the backup data to the decided restoration destination logical unit group, and manages the restoration destination logical unit group as a logical unit group of an access destination of the host; and distributes a path group connecting the access source logical unit group and the restoration destination logical unit group based on the stored used bandwidth of each of the host interface units and the used bandwidth of each of the host interface units at the time of the restoration to each of the host interface units.

8. A storage subsystem, comprising:

a plurality of memory devices for storing data; and a controller for sending and receiving information to and from a host via a network, and controlling input and output of the data into and from the memory device with the memory device as a backup destination or a restoration destination of the data;

wherein the controller measures, at a time of communicating with the host, load information of a plurality of host interface units that send and receive information to and from the host via a network;

stores, at a time of backing up the data, the load information that is measured at the time of the backup; and distributes, at a time of restoring the backup data, the load of each of the host interface units based on the load information that is stored at the time of the backup, manages a storage area of the memory device as a plurality of logical units, and manages each of the host interface units as a relay unit of a path connecting a logical unit of an access destination that is designated in an access request from the host and a logical unit of an access source that is prescribed in the host;

measures a used bandwidth of each of the host interface units as load information of each of the host interface units;

stores, at the time of the backup, the used bandwidth of each of the host interface units that is measured at the time of the backup as the load information;

at the time of the restoration, decides a logical unit group of a restoration destination based on the stored used bandwidth of each of the host interface units and the used bandwidth of each of the host interface units that is measured at the time of the restoration, restores the backup data to the decided restoration destination logical unit group, and manages the restoration destination logical unit group as a logical unit group of an access destination of the host; and distributes a path group connecting the access source logical unit group and the restoration destination logical unit group based on the stored used bandwidth of each of the host interface units and the used bandwidth of each of the host interface units at the time of the restoration to each of the host interface units.

9. The storage subsystem according to claim 8, wherein the controller distributes, at the time of restoration of the backup data, the load of each of the host interface units according to load information that is stored at the time of the backup and load information that is measured at the time of the restoration.

10. The storage subsystem according to claim 8, wherein the controller measures a used bandwidth of each of the host interface units as load information of each of the host interface units;

stores, at the time of the backup, the used bandwidth of each of the host interface units that is measured at the time of the backup as the load information; and distributes, at the time of the restoration, the load of each of the host interface units based on the stored used bandwidth of each of the host interface units.

11. The storage subsystem according to claim 8, wherein the controller manages a storage area of the memory device as a plurality of logical volumes;

measures a used bandwidth of each of the host interface units as load information of each of the host interface units;

stores, at the time of the backup, the used bandwidth of each of the host interface units that is measured at the time of the backup as the load information; and at the time of the restoration, selects a logical volume of an access destination that is designated in an access request from the host as a restoration destination based on the stored used bandwidth of each of the host interface units, and, if the used bandwidth of the host interface unit corresponding to the selected logical volume exceeds a setting value, partitions the selected logical volume into a plurality of logical volumes, decides the partitioned logical volumes as a new restoration destination, and distributes and allocates each of the host interface units to each of the logical volumes of the decided new restoration destination.

12. The storage subsystem according to claim 8, wherein the controller includes a plurality of processors for controlling input and output of the data into and from the memory device;

wherein at least one processor among the plurality of processors manages a storage area of the memory device as a plurality of logical units, and manages each of the host interface units as a relay unit of a path connecting a logical unit group of an access destination that is designated in an access request from the host and a logical unit group of an access source that is prescribed in the host;

measures a used bandwidth of each of the host interface units as load information of each of the host interface units;

stores, at the time of the backup, the used bandwidth of each of the host interface units that is measured at the time of the backup as the load information;

at the time of the restoration, decides a logical unit group of a restoration destination based on the stored used bandwidth of each of the host interface units, restores the backup data to the decided restoration destination logical unit group, and manages the restoration destination logical unit group as a logical unit group of an access destination of the host; and distributes a path group connecting the access source logical unit group and the restoration destination logical unit group based on the stored used bandwidth of each of the host interface units to each of the host interface units; and wherein the respective processors mutually share and execute I/O processing of the data to the restoration destination logical unit group.

\* \* \* \* \*